INVENTORS.
PAUL E. BECKING.
JAMES D. BUNGARD.
BY DONALD J. McCORMICK.

ATTORNEYS

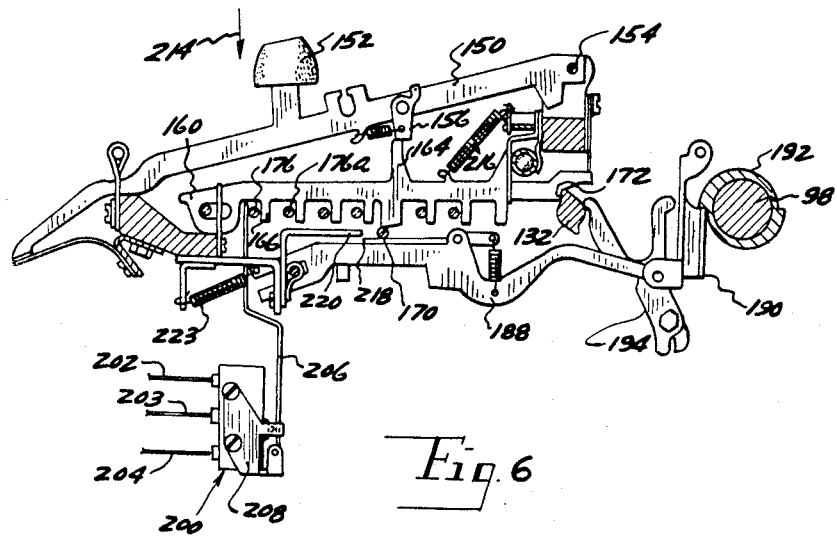
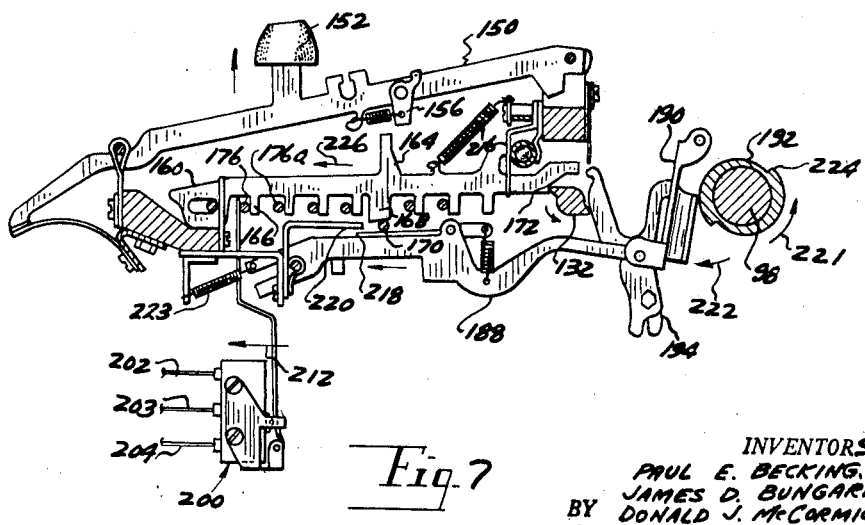

INVENTORS.
PAUL E. BECKING.
JAMES D. BUNGARD.
BY DONALD J. McCORMICK
ATTORNEYS.

INVENTORS.
PAUL E. BECKING.
JAMES O. BUNGARD.
BY DONALD J. McCORMICK
ATTORNEYS.

March 24, 1970     P. E. BECKING ET AL     3,502,187
WRITING SYSTEM
Original Filed Oct. 2, 1962

INVENTORS.
PAUL E. BECKING.
JAMES D. BUNGARD.
BY DONALD J. McCORMICK.

ATTORNEYS.

INVENTORS.
PAUL E. BECKING.
JAMES D. BUNGARD.
BY DONALD J. McCORMICK.
ATTORNEYS.

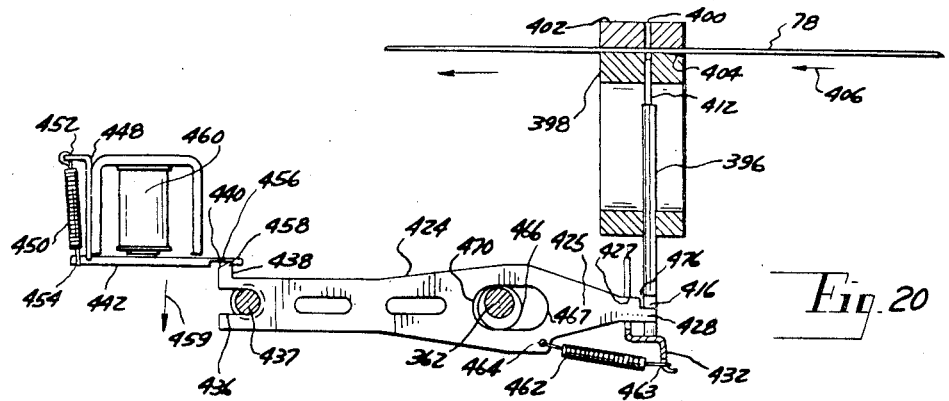
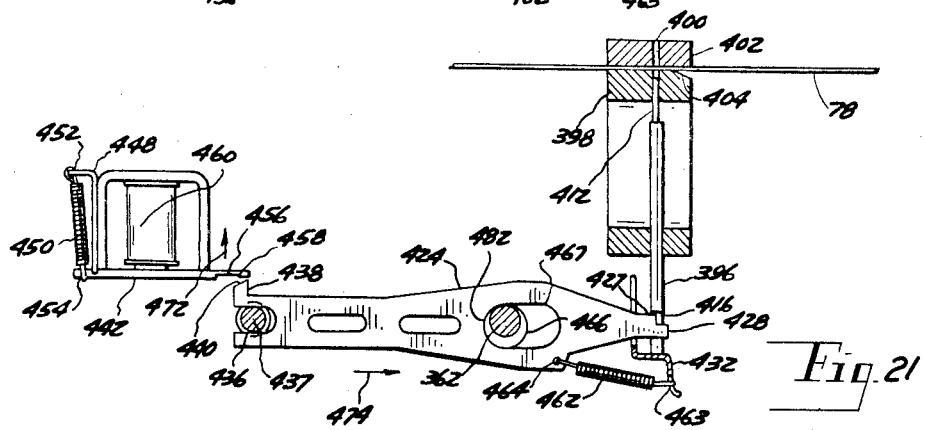
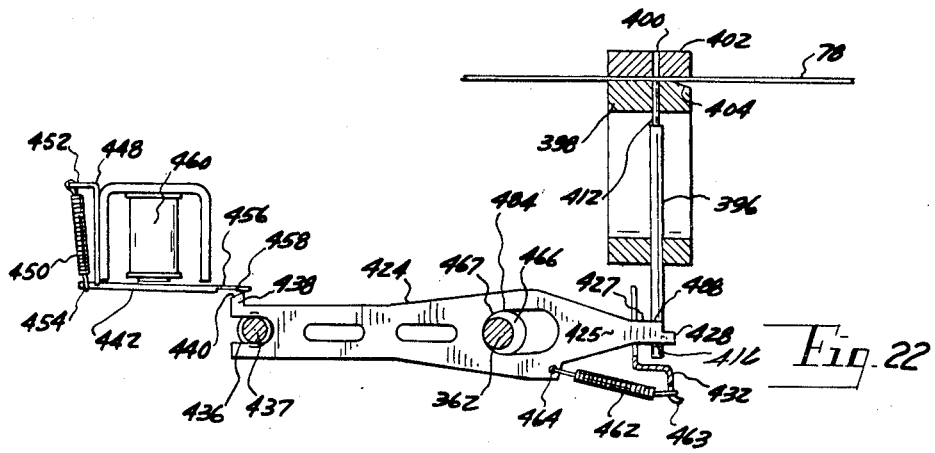

INVENTORS.
PAUL E. BECKING.
JAMES D. BUNGARD.
DONALD J. McCORMICK.

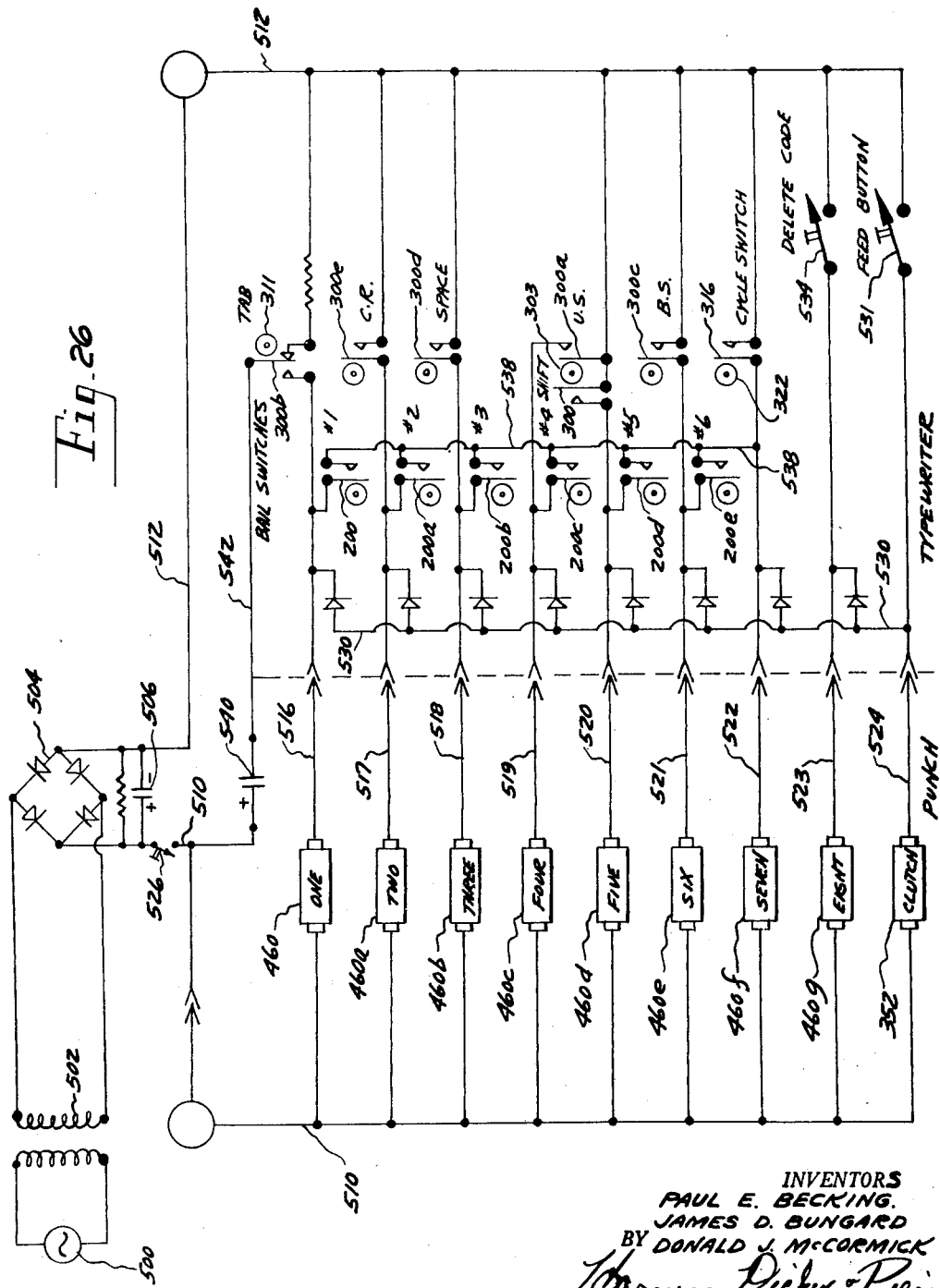

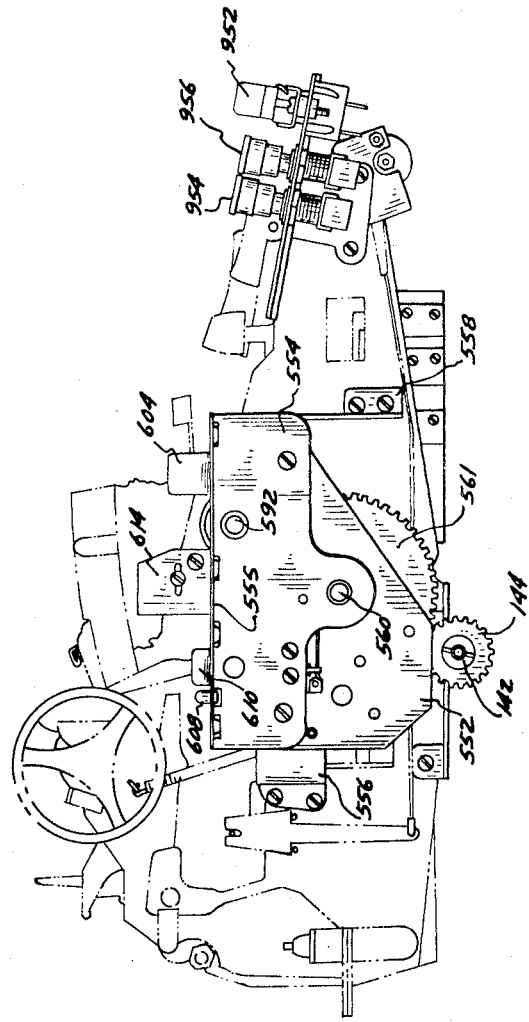

March 24, 1970 P. E. BECKING ET AL 3,502,187
WRITING SYSTEM
Original Filed Oct. 2, 1962 22 Sheets-Sheet 16
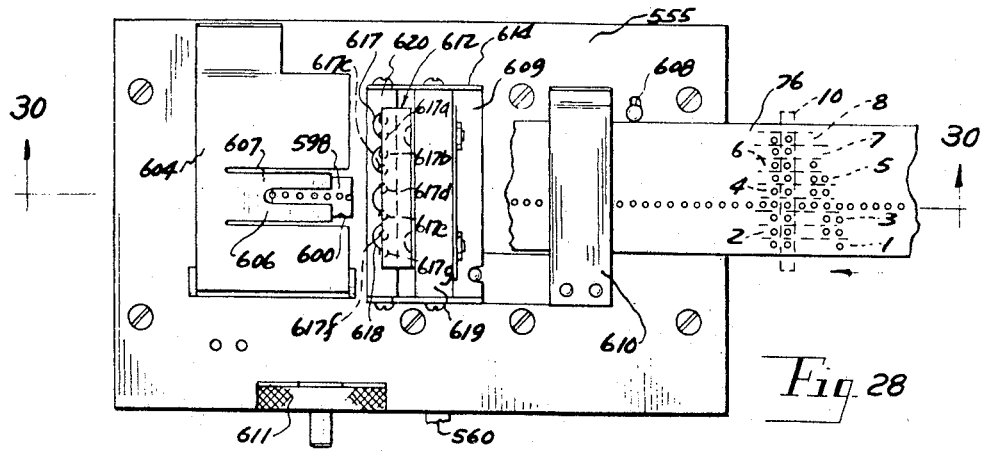
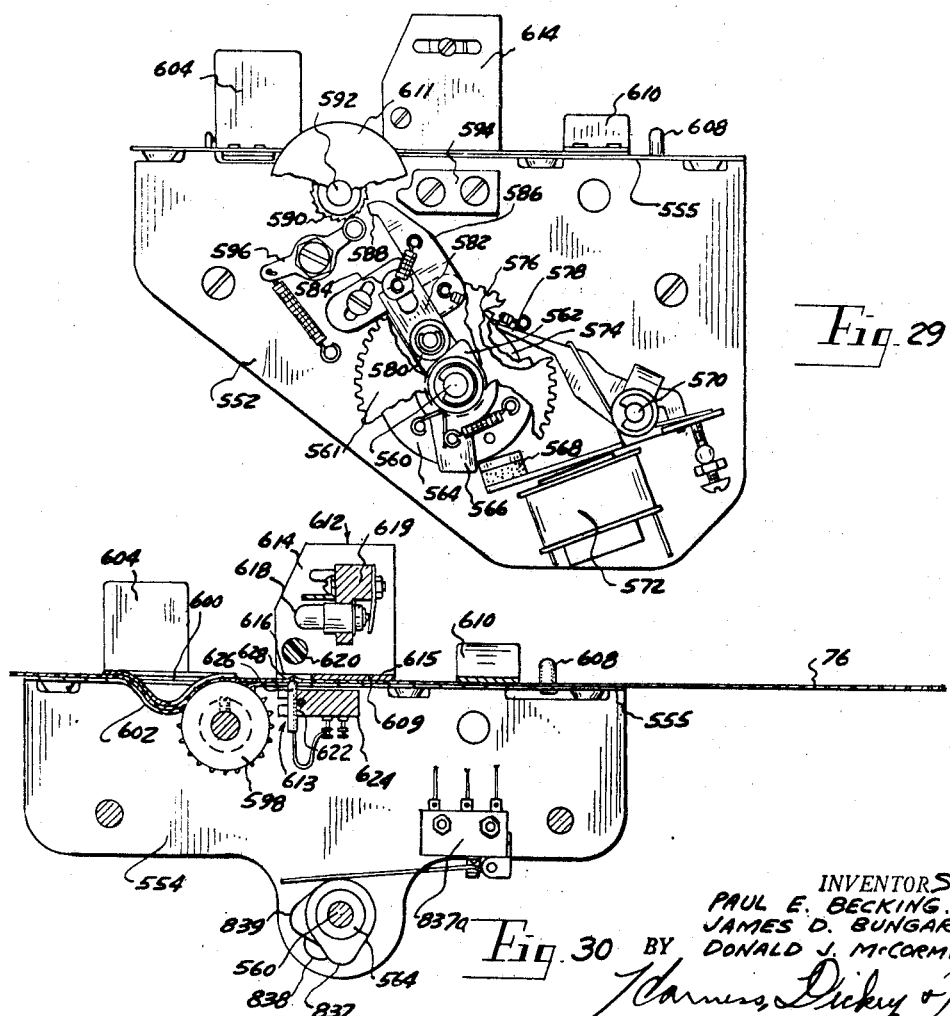
INVENTORS.
PAUL E. BECKING.
JAMES D. BUNGARD
DONALD J. McCORMICK
BY
ATTORNEYS.

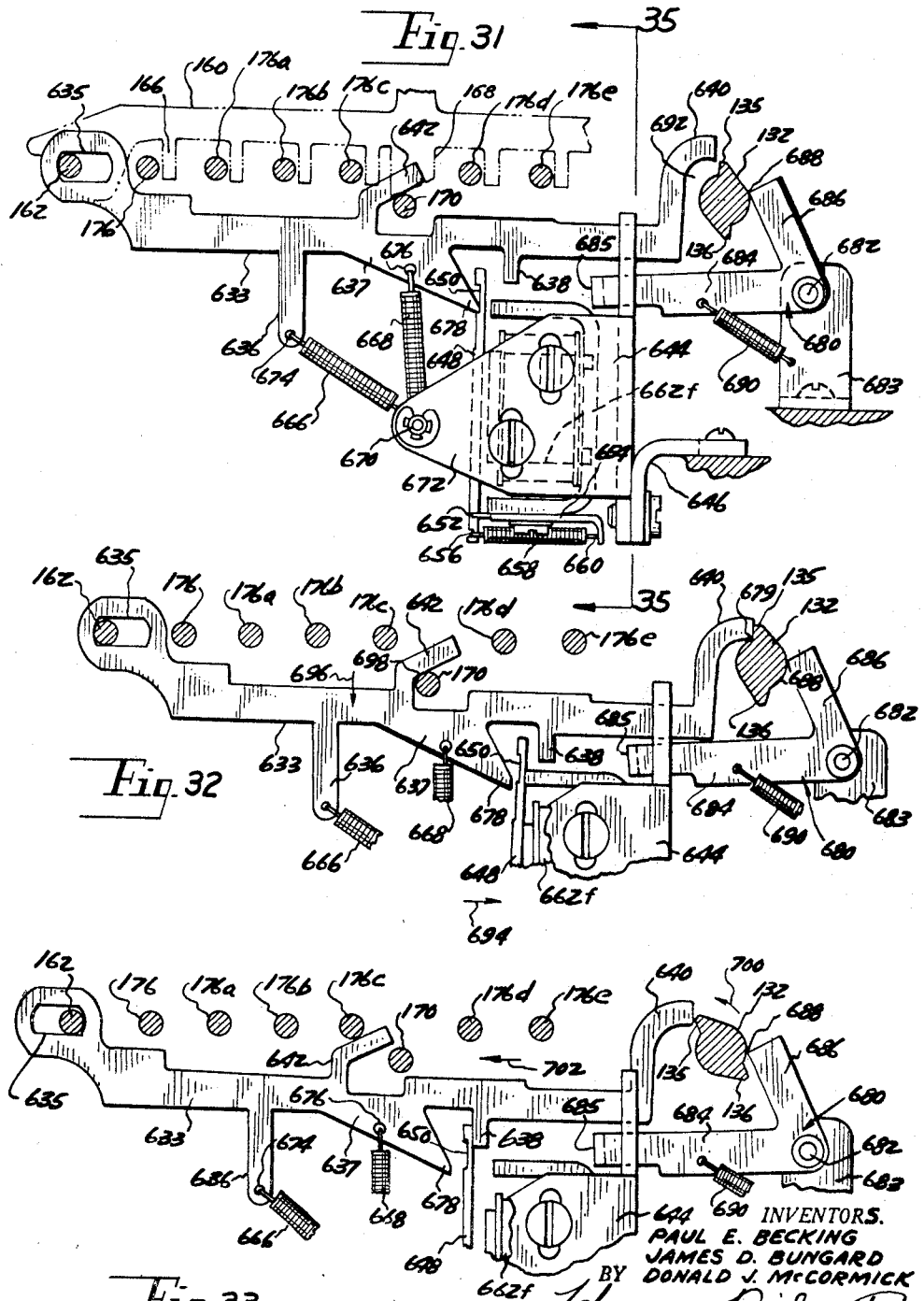

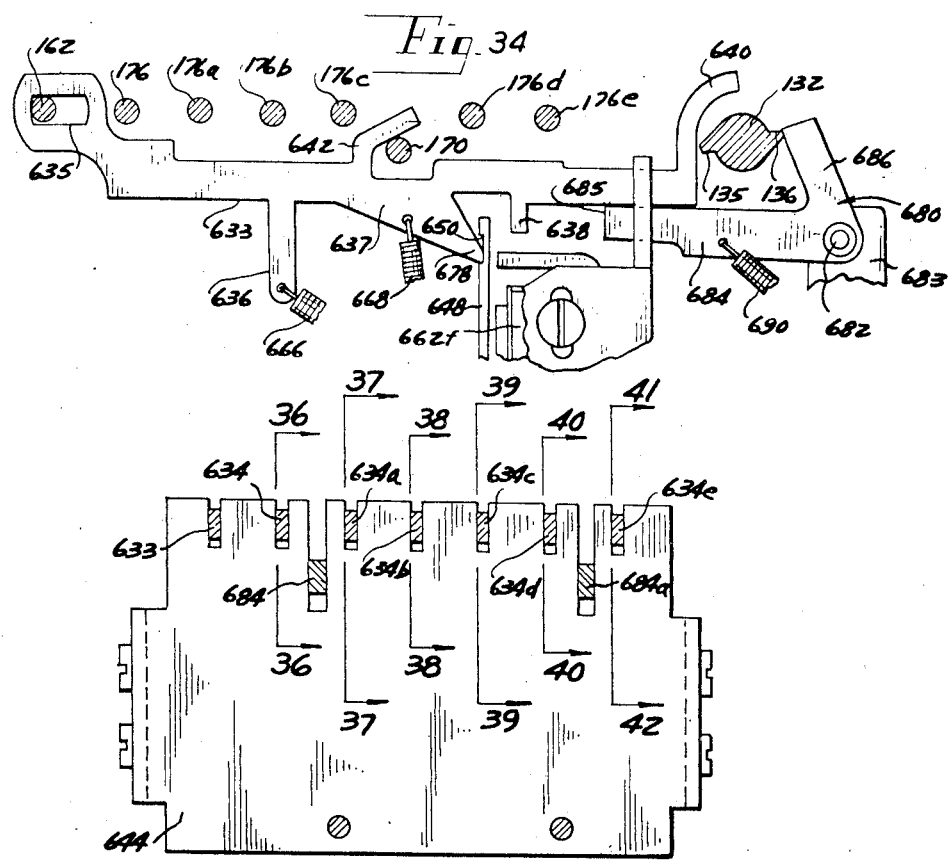
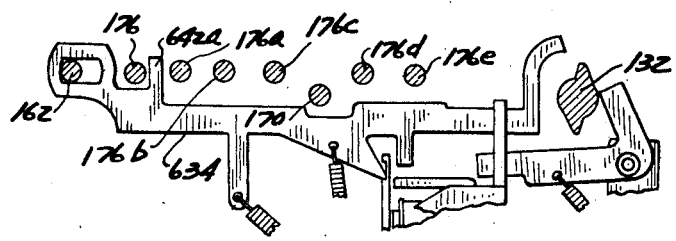

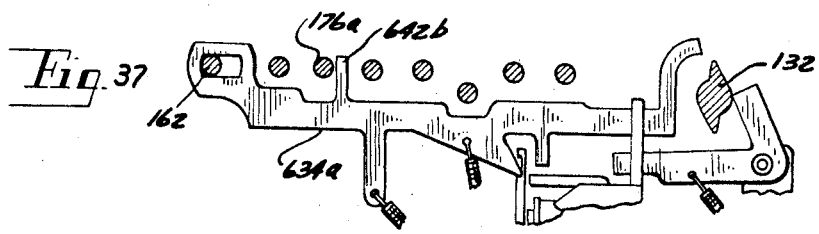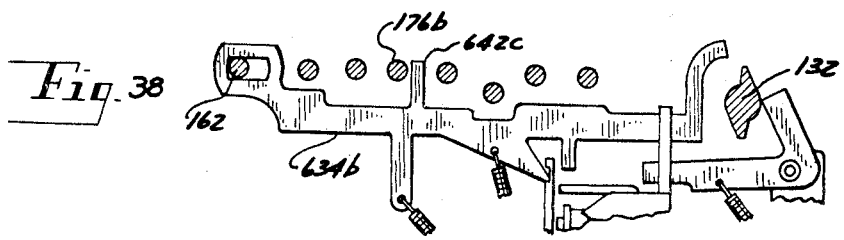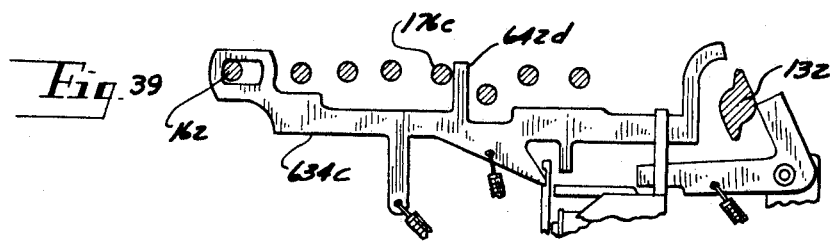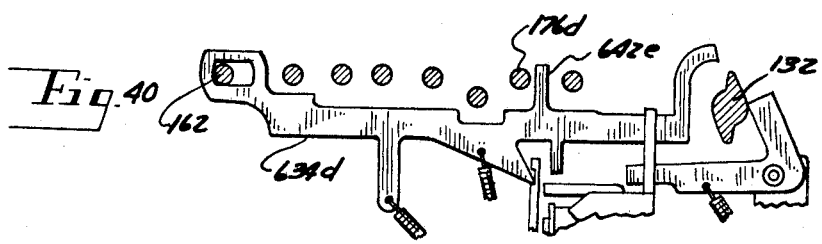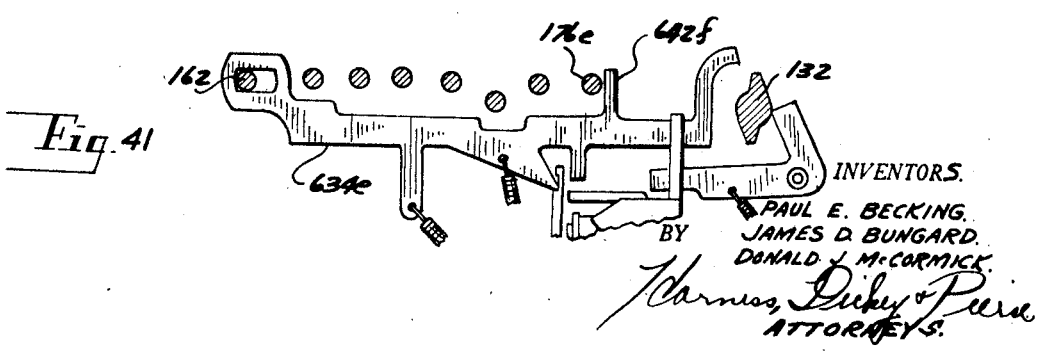

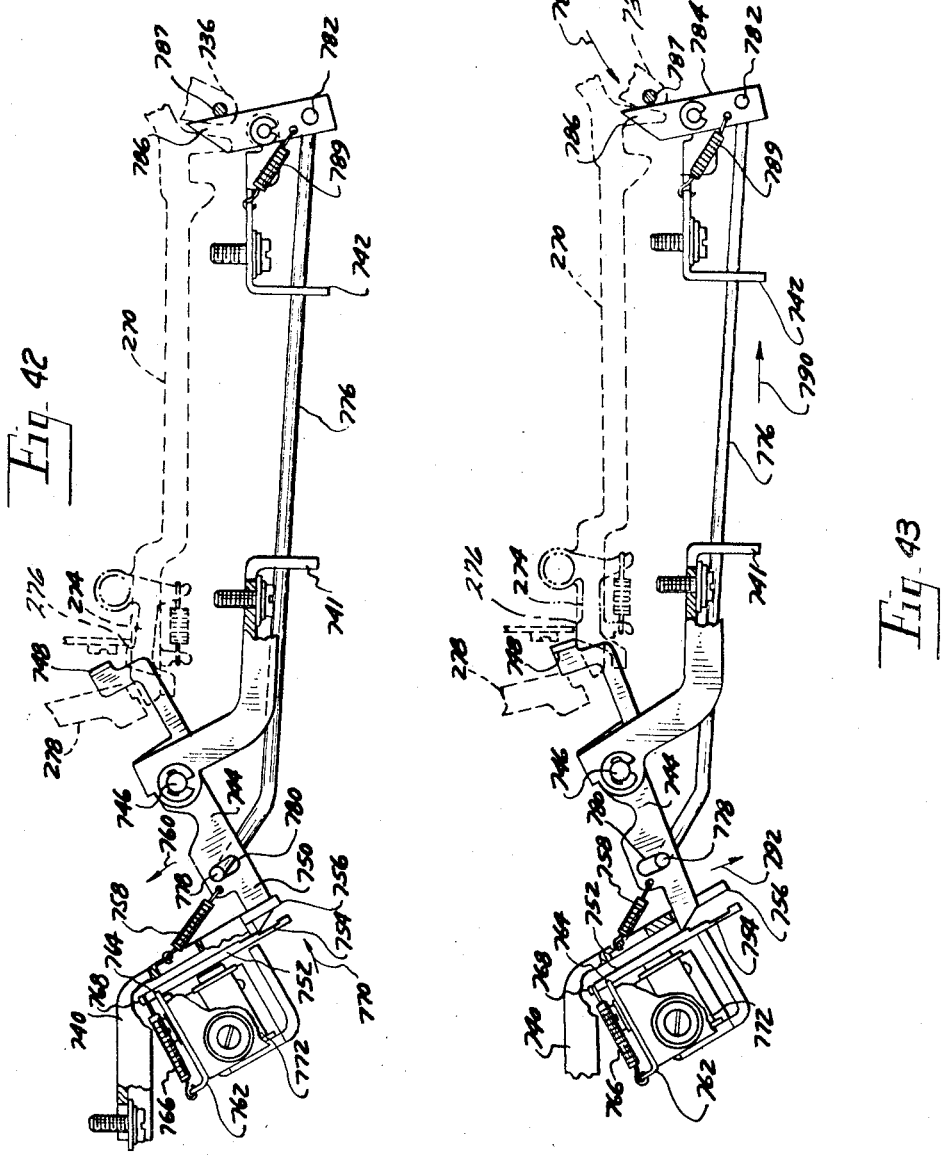

March 24, 1970 P. E. BECKING ET AL 3,502,187
WRITING SYSTEM
Original Filed Oct. 2, 1962 22 Sheets-Sheet 21

Fig. 44

INVENTORS.
PAUL E. BECKING.
JAMES D. BUNGARD.
BY DONALD J. McCORMICK
Harness, Dickey & Pierce
ATTORNEYS March 24, 1970     P. E. BECKING ET AL     3,502,187
WRITING SYSTEM
Original Filed Oct. 2, 1962     22 Sheets-Sheet 22
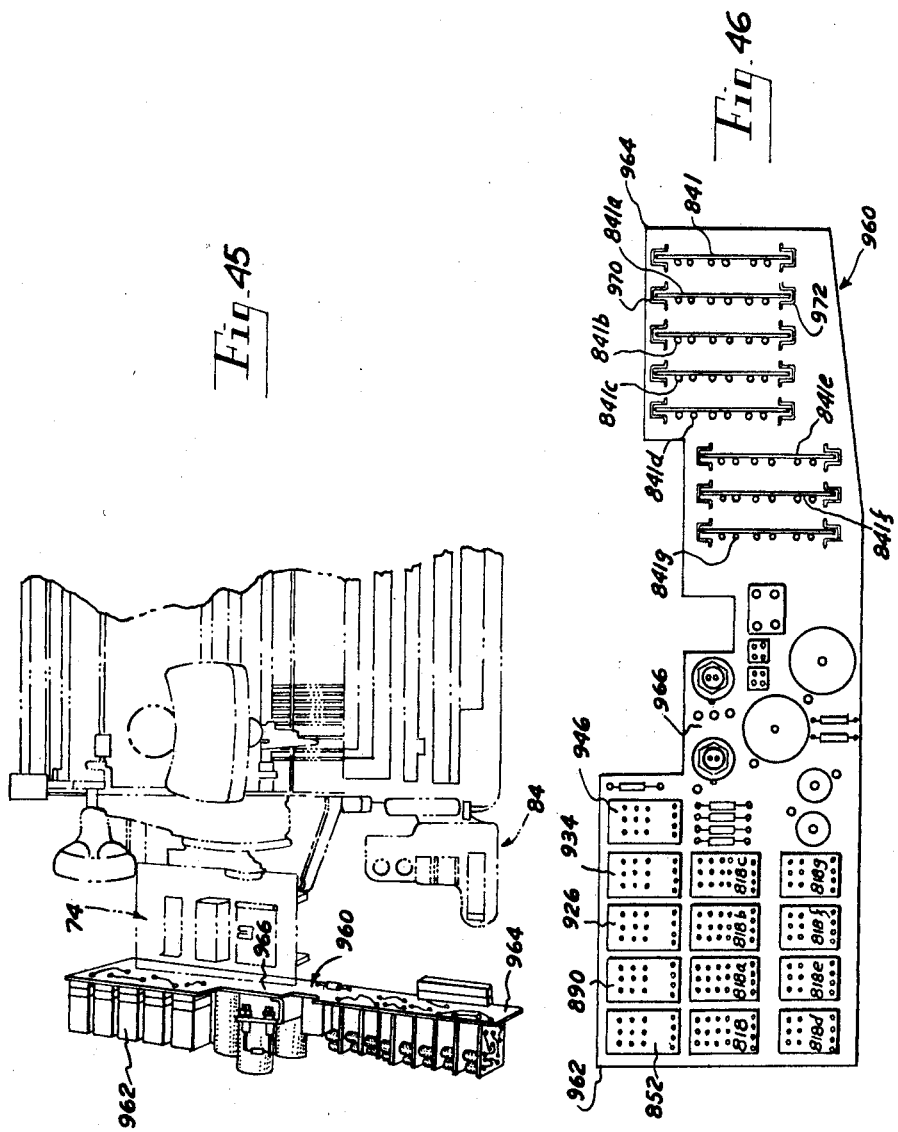
INVENTORS.
PAUL E. BECKING
JAMES D. BUNGARD
BY DONALD J. McCORMICK
ATTORNEYS.

United States Patent Office 3,502,187
Patented Mar. 24, 1970

3,502,187
WRITING SYSTEM
Paul E. Becking, Lake Orion, James D. Bungard, East Detroit, and Donald J. McCormick, St. Clair Shores, Mich., assignors, by mesne assignments, to Intercontinental Systems, Inc., Los Angeles, Calif., a corporation of California
Original application Oct. 2, 1962, Ser. No. 227,767, now abandoned. Divided and this application Jan. 11, 1966, Ser. No. 519,872
Int. Cl. B41j 5/38
U.S. Cl. 197—20
28 Claims This is a division of my copending application Ser. No. 227,767, filed Oct. 2, 1962 now abandoned.

This invention relates to automatic writing systems. In general, the inventive principles of the present invention are embodied in an automatic writing system comprising a manually and automatically operable writer unit, writing operation recording means for making a record of operation of the writing unit which subsequently may be utilized to duplicate the recorded operation of the writing unit step by step, and writing operation reproducing means to produce duplicate operation of the writing unit in accordance with information stored by the record means. Although the broad combination of components have previously been proposed in various forms, previous systems have utilized complicated mechanisms and controls which resulted in limitations in operational speed, high manufacturing costs, high wear rates in use, and costly maintenance programs. Furthermore, the previous systems have tended to be bulky and unwieldy resulting in a generally unattractive system having installation and storage problems.

In the preferred form of the invention, the basic system components comprise: a writing unit in the form of an electrically powered typewriter; operation recording means in the form of punch means for coding a paper tape or the like having transmitter mechanism and circuitry for providing coded electrical output signals representative of typewriter operations; and operation reproducing means in the form of reader means for translating information stored on a paper tape or the like into electrical input signals, receiver mechanism and, control circuitry energizable by the electrical input signals, and writing unit actuating means responsive to energization of the control circuitry and connected to the writing unit to produce operation thereof in accordance with the information on the paper tape. The components have been incorporated in a system capable of being housed in a single compact casing approaching the size and appearance of a conventional typewriter casing alone. Consequently, the system may be stored, transported, and installed with the convenience of a simple typewriter unit. Furthermore, the system components have been changed in design, substantially reduced in number and simplified, rearranged in combination and cooperatively associated in an improved manner resulting in substantial reduction in cost, in improved high speed operation, and in durability and reliability in use.

A primary object of the present invention is to provide a new and improved high speed automatic writing system.

Another object of the present invention is to provide a high speed automatic writing system having writing operation recording means and writing operation reproducing means associated with a writing unit in a manner permittnig operation of the writing unit at maximum speed during all system operations involving either or both the recording means and the reproducing means. In other words, a purpose of the present invention is to provide an automatic writing system wherein maximum writing speed is determined solely by the writing unit so that supplementary operations such as coding tape by means of an associated punch, reading tapes by reader means associated therewith for causing automatic operation of the writing unit, or reproduction of extra tapes while the writing unit is automatically controlled will not affect the system speed.

Another object of the present invention is to provide an integrated writing system comprising, in a single casing, a writing unit, writing operation recording means, writing operaton reproducing means, a power source, and associated controls. In this regard it is a further object of the invention to provide a new and improved writing unit, operation recording means, and operation reproducing means combination facilitating a balanced and compact association of parts requiring a minimal increase in size of a single enclosing casing relative to the size of a casing required for the writing unit alone.

Still another object is to provide an automatic writing system comprising a writing unit, operation recording means, and operation reproducing means integrally associated within a single housing formed by upper and lower shells wherein the writing unit is centrally located relative to the ends of the housing and a record receiving means associated with the operation recording means is located at one end and a record receiving means associated with the operation reproducing means is located at the opposite end.

Another general object of the present invention is to provide an improved drive arrangement for operating a writing unit, a punch of a writing operation recording means, and a reader of a writing operation reproducing means from a common power source.

A more specific object is to provide an automatic writing system wherein a writing unit is connected by transmitter means to a punch means in a novel and improved manner for operation of the punch means to code a tape record in accordance wth the operation of the writing mechanism. To this end output devices in the form of punch controlling solenoid means are directly electrically operable by simple switch mechanisms operated directly and positively by mechanical association with appropriate mechanisms of the writing unit. In accordance with this object of the invention, electrical signal generating switch means having extended actuation fingers are mounted interiorly of the system casing and protrude into the writing unit at appropriate points for direct actuation by the operating mechanisms thereof at appropriate times to cause energization of the solenoid means associated with the punch means and coding of all printing operations and functional operations of the writing unit on a tape record.

A further object is to provide new and improved controls for directly actuating a writing operation recording means by operational mechanisms of the writing unit without the necessity of additional interposers, links, levers, cams, bails, restorers and the like.

Another specific object is to provide, in an automatic writing system, a new and improved punch means. In this regard, it is a further object of the invention to provide an improved means of operably connecting individual punches to punch drive means. To this end new and improved interposer means are provided which facilitate accurate and positive control of the individual punches with a minimum of associated interposer control parts. The interposer means and the individual punches are provided with special connecting drive means which permit actuation of the interposer means to drive the punches by a common drive means in a new and improved manner whereby punch interposers are positively reset and the punches are positively driven to and from punching engagement with a tape.

A further specific object of the invention is to provide a new and improved automatic writing operation reproducing means in a writing system including a writing unit and a writing operation recording means mounted in a common casing. In this regard, it is an object to provide new and improved photoelectric reader means permitting high-speed operation with positive and accurate translation of information from a record into electrical signals. To this end photoelectric means capable of generating electrical signals and a light source means for actuating the photoelectric means are arranged in an improved manner to obtain accurate translation of recorded information at maximum speeds.

An additional object is to provide new and improved writing operation reproducing means for operating a writing unit in response to signals obtained by a record reading operation. In this regard it is an object of the invention to provide mechanical translation means to actuate a writing unit having a manually operable keyboard by direct connection and association with the writing unit printing operations mechanism and function operations mechanism without the necessity for or actuation of the writing unit keyboard mechanisms.

A further object is to provide a new and improved control means for actuating a writing unit in response to control signals obtained through a record reading device. To this end, new and improved input signal receiver mechanism and circuit means are provided which permit continuous operation at maximum speed by obtaining a new set of control signals from the record means during writing unit operation in response to a previously obtained set of control signals whereby the next writing unit operation will begin immediately upon completion of the previous writing unit operation. Input signal control means in the form of relays and interposers are associated with the control circuitry in a new and improved manner to enable input signals for subsequent writing unit operation to be stored until completion of operation of the writing unit occurring during the time the input signals are received.

It is an object of the invention to provide simplified means for actuating a writing unit from a control tape record by actuation of mechanical control devices through solenoids energized in response to signals generated by photoelectric devices. To this end, novel mechanical actuating mechanisms are associated with the writing unit to duplicate printing operations and functional operations in response to input signals from a tape control system. The mechanisms are actuable to duplicate printing and functional operations of the writing unit at points intermediate the input of control signals and the responsive actuation of the writing unit in manual operation. That is, the automatic record controlled mechanism is integrated with the manually controllable writer unit to completely bypass the key selection mechanism.

Still another object of the present invention is to provide new and improved control circuitry and electrical components integrated in a single casing with an automatic writing system comprising an electric writing unit, a writer operation recording means, and a writer operation reproducing means. To this end, an improved electrical control circuit and component arrangement is provided which includes a main input signal control board mounted adjacent the recording means and integrated within the writing system casing. The controls comprise, for each output signal to the writing unit, a separate relay unit individually connectible into the board and replaceable; and, for each input siginal from the record means, a separate circuit plate individually connectible and replaceable into the board so that the control circuitry is susceptible of wide variations and change when necessary. To this end, the control board and circuit plates are in the form of printed circuits.

The foregoing objects, and others, are attainable by utilization of the inventive principles as hereinafter disclosed by reference to an illustrative writing system embodiment of the invention shown in the accompanying drawings wherein:

FIGURE 6 is another side elevational view of the apparatus shown in FIG. 5 in another operational position;

FIGURE 7 is another side elevational view of the apparatus shown in FIG. 6 in another operational position;

FIGURE 20 is a side elevational view of a portion of the punch apparatus;

FIGURE 21 is a side elevational view of the apparatus shown in FIG. 20 in a subsequent operational position;

FIGURE 22 is a side elevational view of the apparatus shown in FIG. 21 in a subsequent operational position;

FIGURE 26 is a circuit diagram illustrating the control system for the writing operation recording means of the present invention;

FIGURE 27 is an elevational view of the other end of the writing mechanism of FIG. 1 with parts removed to show the reader apparatus;

FIGURE 28 is a plan view of the reader apparatus;

FIGURE 29 is a side elevational view of the reader apparatus clutch;

FIGURE 30 is a sectional view taken along the line 30—30 in FIG. 28;

FIGURE 31 is a side elevational view of apparatus for causing print operations of the writing unit in accordance with signals generated by the reader apparatus;

FIGURE 32 is a partial side elevational view of the apparatus shown in FIG. 31 in another operational position;

FIGURE 33 is a partial side elevational view of the apparatus shown in FIG. 32 in another operational position;

FIGURE 34 is another side elevational view of the apparatus shown in FIG. 33 in another operational position;

FIGURE 35 is a sectional view taken along line 35—35 in FIG. 31;

FIGURE 36 is a sectional view taken along the line 36—36 in FIG. 35;

FIGURE 37 is a sectional view taken along the line 37—37 in FIG. 35;

FIGURE 38 is a sectional view taken along the line 38—38 in FIG. 35;

FIGURE 39 is a sectional view taken along the line 39—39 in FIG. 35;

FIGURE 40 is a sectional view taken along the line 40—40 in FIG. 35;

FIGURE 41 is a sectional view taken along the line 41—41 in FIG. 35;

FIGURE 42 is a side elevational view of apparatus for causing functional operations of the writing unit in accordance with signals generated by the reader apparatus;

FIGURE 43 is a side elevational view of the apparatus shown in FIG. 42 in another operational position;

FIGURE 44 is a circuit diagram illustrating the control system for the writing operation reproducing means of the invention;

FIGURE 45 is a partial perspective view of the reader end of the apparatus shown in FIG. 1 with parts removed to show control system attachments; and FIGURE 46 is a side elevational view of the control attachments shown in FIG. 45.

THE WRITING SYSTEM UNIT

Figure 1:
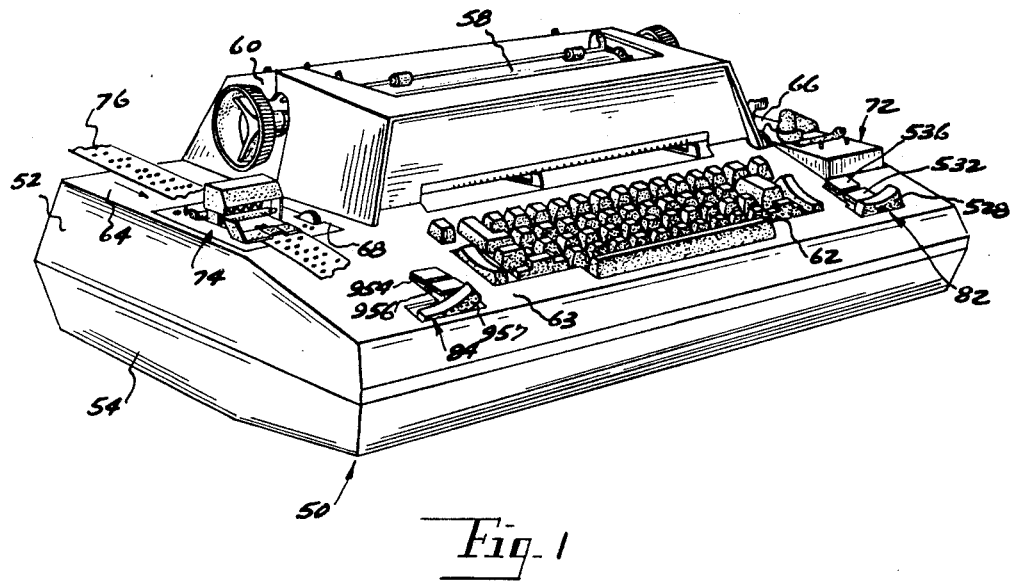
FIGURE 1 is a perspective view of the illustrative embodiment of the invention.
Figure 2:
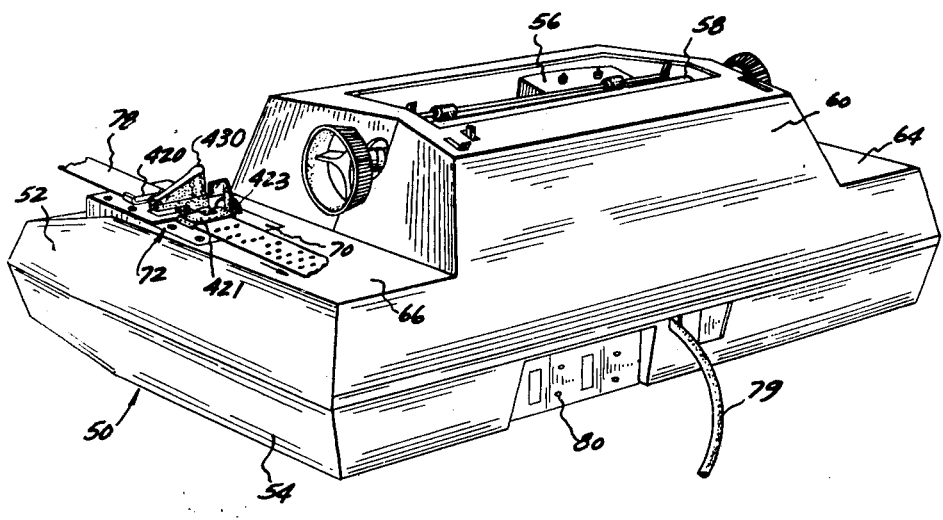
FIGURE 2 is another perspective view of the apparatus shown in FIG. 1.

Referring now to FIGS. 1 and 2, the subject writing system is shown completely enclosed within a housing 50 which may be formed by upper and lower casing shells 52, 54. The writing unit comprises an electric typewriter centrally located within the housing. The upper portion of the typewriter, including a type head unit 56 and a platen 58, is enclosed by a centrally located raised portion 60. The keyboard 62 and associated controls are centrally located in an inclined front panel 63 of the housing. Substantially flat deck portions 64, 66 are provided on each side of the central raised portion 60. Centrally located cut-outs 68, 70, into which the upper record receiving portions of a record forming means 72 and a record reader means 74 protrude, are provided at each side of the central raised portion. The record means comprises paper tapes such as illustrated at 76 and 78, but can, in the broadest aspects of the invention, take other forms such as magnetic tapes, discs, etc.

The record forming means 72 comprises a punch means which is selectively operable in response to actuation of the writing unit to prepare a coded record of the writing operation on the paper tape 78. Preselected codes of conventional binary code form are recorded on the tape by punched holes arranged in columns extending transversely of the tape. In the preferred embodiment, an eight channel code is utilized although other code forms also may be utilized as desired. Each column of holes represents a separate print operation or functional operation of the typewriter. The term print operation refers to those typewriter operations concerned with the selection of a particular type character and the printing of that character. The term functional operation refers to those typewriter operations concerned with implementing the print operations such as tabulation, indexing, carrier return, shift, backspace, etc. The reader means 74 is adapted to decode paper tapes 78 and cause actuation of the writing unit in response thereto to duplicate all of the original writing operations which occurred during the production of the coded tapes 78.

As may be seen in FIG. 2, the only system component external to the housing is lead-in wire 79 which is connectible to a suitable power source. However, in order to permit the writing system to be associated with other apparatus in more complicated systems, a plurality of jacks 80 may be suitably located as in the back of the machine. In this manner, the subject writing system may be associated with other writing system components and other business machines to provide a wide variety of applications and programming. In addition to the keyboard 62 for manual operation of the writing unit, a punch control cluster 82 is provided on the right-hand side of the upper casing adjacent the punch means and a reader control cluster 84 is provided on the left-hand side of housing adjacent the reader means.

The illustrative writing mechanism of the present writing system takes the form of a high-speed electrically operated typing machine of conventional design which is modified as hereinafter described in detail for association with the subject writing system. In the preferred embodiment, the typewriter has a sphere-type printing head on which all of the type characters are integrally formed rather than a plurality of individual type bars. The print operations and functional operations of the typewriter are powered by means of an electric motor after manual selection by an operator through the keyboard and associated controls. The typewriter is of conventional design and is manufactured by International Business Machines under the model designation Series 72. The details of operation of the typewriter are fully disclosed in the "Series 72 Instruction Manual," copyrighted 1961, which is hereby made a part of and incorporated into the present disclosure. Since the typewriter mechanism is commercially available, and well understood by those in the writing system art, only sufficient details will be hereinafter disclosed for description of the writing system in which the inventive principles are incorporated.

SYSTEM DRIVE ARRANGEMENT

Figure 3:
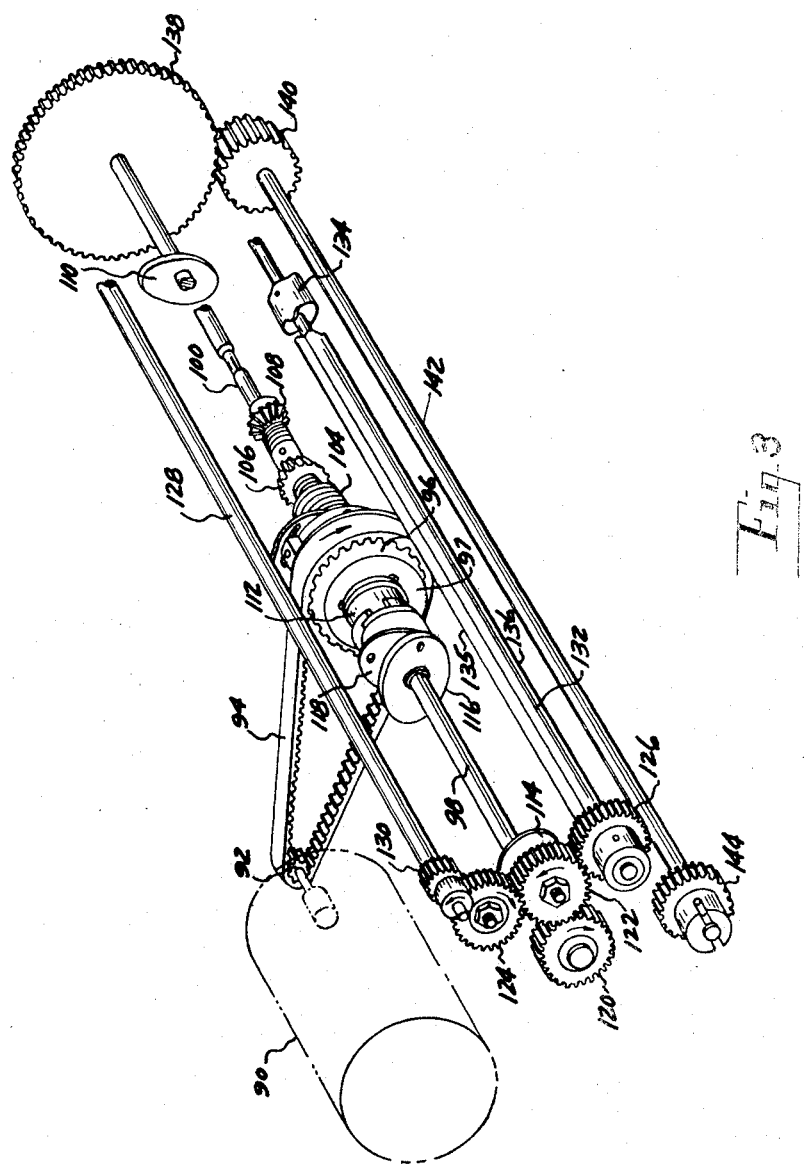
FIGURE 3 is a perspective view of the drive mechanism of the apparatus shown in FIG. 1.

Referring now to FIG. 3, the drive mechanism of the writing system comprises a single power source 90 in the form of a conventional electric motor which is adapted to drive a pinion 92 and a drive belt 94. The drive belt is drivingly connected to a drive pulley 96 mounted on a hub 97, which rotatably supports shaft members 98, 100. The opposite ends of the shafts are rotatably supported in suitable bearing means mounted at the sides of the writing unit on a portion of the typewriter frame.

Figure 8:
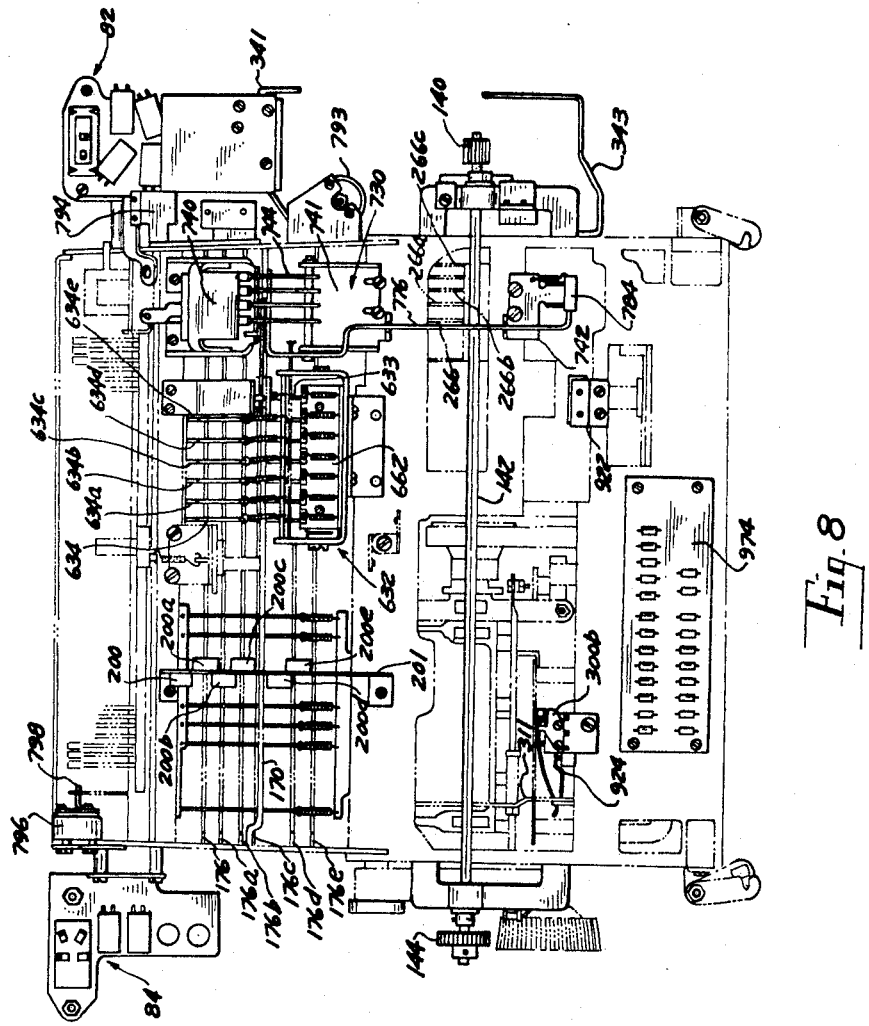
FIGURE 8 is a bottom view of the writing unit of FIG. 1.

The shaft 100 is conventionally referred to as the operational cam shaft and is continuously rotatably connected to the hub 97. A torque limiter means 104 and drive pinions 106, 108 are mounted on the continuously rotating shaft 100 and form part of the typewriter carrier return and tab mechanisms. A plurality of cam assemblies 110a–c, FIGURE 8, are also mounted on the shaft 100 for control of certain functional operations and are also shown schematically at 110 in FIGURES 9 and 10. All powered functional operations of the writing unit are powered by the shaft 100 and include the space bar, backspace, carrier return, indexing, and shift operations. The shaft 100 also controls the speed of the carrier during a tab operation.

The shaft 98, conventionally referred to as a cycle shaft, is connected to the drive hub 97 through a spring clutch arrangement 112 which operates the cycle shaft whenever a character selecting key lever is depressed. A plurality of cams 114, 116 and 118 are mounted on the cycle shaft for rotation therewith. The clutch 112 controls rotation of the cycle shaft and cams and limits rotation thereof to 180° for each time a key lever is depressed.

The cams power the position of the type head through conventional mechanisms, which are conditioned by key lever actuation to obtain the selected print operation when the cycle shaft is operated.

A pinion 120 is mounted on the end of cycle shaft 98 and is drivingly associated with a cluster of gears 122, 124, 126. The print mechanism includes a print shaft 128 extends longitudinally of the typewriter and is rotatably mounted in the typewriter frame at the sides of the writing unit. In the present description, longitudinal is assumed to be parallel to an axis extending between the sides of the writing unit parallel to the shafts 98, 100, 128. The gear 124 and a drive gear 130 actuate the shaft 128 which in turn operates the print mechanism of the typewriter, the type aligning mechanism, and the ribbon feed and lift mechanisms. Another control shaft 132, which provides cam shaft means commonly referred to as the filter shaft, extends longitudinally of the writing unit parallel to the other shafts and is rotatably secured at its ends in the typewriter frame. The filter shaft is driven by gear 126 and supports an escapement cam 134 on one end. The filter shaft has cam means formed thereon having opposite lobes 135, 136 and is adapted to operate the character selection mechanism, a print escapement, a shift interlock, and a space bar lockout device.

A gear 138 is mounted on the end of the continuously rotating shaft 100 and is drivingly associated with a drive pinion 140 mounted on a longitudinally extending reader operating shaft 142 rotatably supported at the sides of the typewriter unit. The gear 138 is operatively connected to the punch means in a manner hereinafter disclosed in detail. The other end of the shaft 142 includes a reader means drive gear 144 adapted to be operatively connected to the reader means in a manner hereinafter described in detail.

WRITING UNIT PRINT OPERATION MECHANISM

Referring now to FIGS. 4–8, the manual operation of the typewriter by depression of a key lever is described by reference to a single key lever 150 and its associated operating mechanism. It will be understood that the other key levers of the keyboard are similarly operable. In general, actuation of a key lever 150 prepares print character selection mechanism, including sets of coded character selection elements, for operation and trips cycle shaft clutch means to actuate the cycle shaft and cause a print operation.

Figure 4:
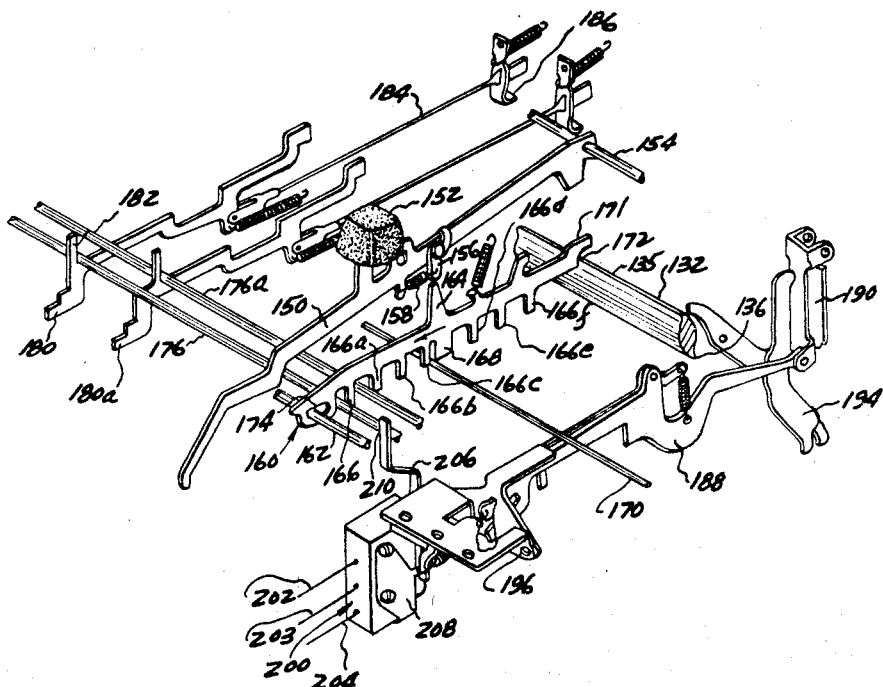
FIGURE 4 is a perspective view of a portion of the printing operation mechanisms of the apparatus of FIG. 1.

Referring now particularly to FIG. 4, each key lever 150 is manually operable by depression of a key button 152 causing pivotal downward movement about a pivot shaft 154. A pawl 156 is pivoted to the key lever and biased to a downwardly extending position by a pawl spring 158. A selector interposer 160 is mounted beneath each of the key levers on a pivot rod 162. An upwardly extending lug 164 is located for abutting engagement with the pawl 156 of the key lever to cause downward movement of the selector interposer. A plurality of selector lugs 166–166ƒ are provided along the bottom of the selector interposer in varying spaced relationship. Each selector interposer has a different selector lug arrangement to provide a typewriter print selection code of N bits. However, a common lug 168 is provided centrally of each interposer and is adapted to engage a cycle clutch shaft actuating bail 170. The rear of the interposer is provided with a latch surface 171 and a cam surface 172 adapted to be engaged by the cam portions 135, 136 of filter shaft 132. The interposer 160 is pivotally mounted on the pivot shaft 162 by means of an elongated slot 174 which permits longitudinal displacement as well as pivotal movement of the interposer.

Six selector bails 176–176e (FIG. 8) extend transversely of the key levers and the selector interposers. Portions of the selector bails extend through the selector interposers adjacent the selector lugs. The selector bails 176 are located between the different selector lugs 166 of the selector interposers 160 for selective engagement therewith and lateral displacement thereby. The selection of particular bails and interposers is accomplished by downward pivotal movement of the selector interposers during key lever actuation. When a selector interposer has been downwardly pivoted, the filter shaft 132 rotates one of the cam portions 135, 136 into engagement with the cam surface 172 and drives the selector interposer away from the filter shaft. Latch interposers 180–180e are operatively connected to the selector bails. Lug means 182 are mounted on the latch interposers and adapted to be selectively engaged and driven by selector bails 176–176e during lateral displacement thereof. The latch interposers are connected by rods 184 to selector latches 186 which control location of the print head to select a particular print character and condition the typewriter for a print operation powered by the cycle shaft 98.

Figure 5:
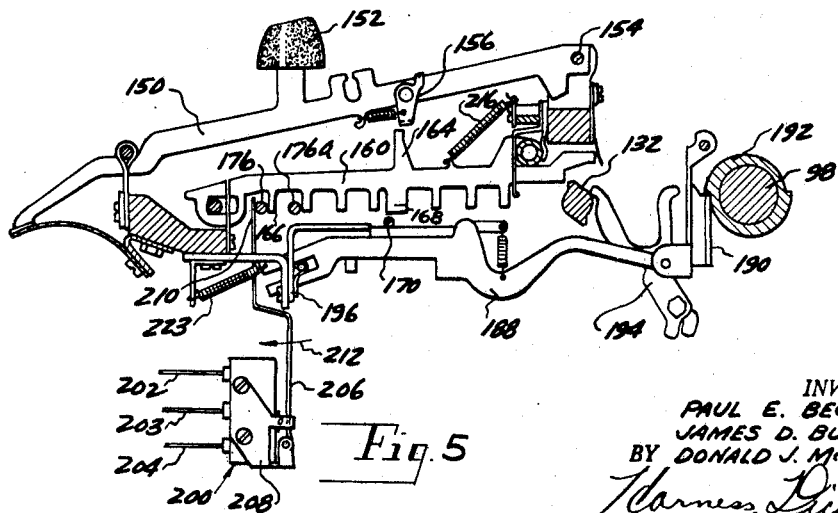
FIGURE 5 is a side elevational view of a portion of the mechanism shown in FIG. 4.

Operation of the cycle shaft is attained during pivotal downward displacement of the selected interposer by engagement of the lug 168 with cycle clutch bail 170. Downward displacement of the cycle clutch bail actuates a latch link 188 which in turn releases a latch lever 190 controllably associated with a cycle clutch sleeve 192 forming part of the cycle clutch 112 as shown in FIG. 5. A latch restoring mechanism 194 is pivotally mounted adjacent the latch 190 and is engageable at one end by the filter shaft 132 to return the latch 190 to restraining engagement with the clutch sleeve 192. The other end of the latch link 188 is slidably supported on bracket means 196.

OUTPUT CODE GENERATING MEANS FOR PRINT OPERATIONS

The selector bails 176 must be selectively actuated in a predetermined combination to obtain a particular print operation. Consequently, the lateral movement of the selector bails reflects a typewriter code for a particular print character selection. Therefore, movement of the selector bails 176 may be advantageously utilized to generate control signals for the punch means in an output code corresponding to the typewriter code for selection and actuation of the selector interposers and the selector bails. A punch code selection means is provided by electrical signal generating means in the form of switch means of limit switch type devices 200–200e which are secured to a frame portion of the writer unit by a bracket 201 or the like, as shown in FIG. 8. The term "limit switch" is intended to define self-contained switching units operable by moving mechanisms to control associated output circuitry. Referring again to FIGS. 4–8, the switch means control energization of output device selection circuitry by leads 202, 203, 204. Each switch is actuable by means of an elongated actuating arm 206 which is pivoted on a bracket 208 at the side of the switch 200 and extends upwardly into the writing unit mechanism for direct engagement with one of the selector bails as shown at 210. The actuating arm 206 is spring biased outwardly into constant engagement with the selector bail. Consequently, any movement of the selector bail will cause corresponding rotative movement of the actuator arm 206 in the direction of the arrow 212 and close switch 200 to complete a circuit through the lines 202, 204. It is to be understood that each of the selector bails has a switch means 200 and a punch selection circuit associated therewith.

OPERATION OF WRITING UNIT PRINT MECHANISM

In general, the selection of a particular print character by depressing a selector button 152 in the direction of the arrow 214 in FIG. 6 results in pivotal movement of the selector member 150 about the shaft 154 to abuttingly engage the pawl 156 and the pawl lug 164. The interposer 160 is normally maintained in the uppermost position shown in FIG. 5 by a return spring 216. When the pawl engages the pawl lug 164, the interposer is downwardly displaced until the cam surface 172 is brought into position closely adjacent one of the cam portions of filter shaft 132 as shown in FIG. 6. Downward displacement of the interposer simultaneously moves the cycle lug 168 into engagement with the cycle clutch bail 170 to downwardly displace an abutment lever 218 from latching engagement with an abutment surface 220 and releaes link 188. Spring means 223 actuates the latch link away from the shaft 98 and releases latch 190 from engagement with the cycle clutch sleeve 192. Cycle shaft is then free to rotate 180° until the next abutment surface 224 comes into engagement with the latch 190 again as shown in FIG. 7. The latch is returned into an abutting engagement position by the return mechanism 194 which is actuated through the filter shaft 132.

The filter shaft 132 rotates and cams the interposer 160 forwardly in the direction of the arrow 226 in FIG. 7 to cause displacement of one or more of the bails 176–176e associated therewith. Movement of the bails causes corresponding movement of the associated switch actuating arms 206 in the direction of the arrow 212 to close the switch 200 and complete a circuit through the lines 202, 204.

WRITING UNIT FUNCTIONAL OPERATION MECHANISM

Figure 9:
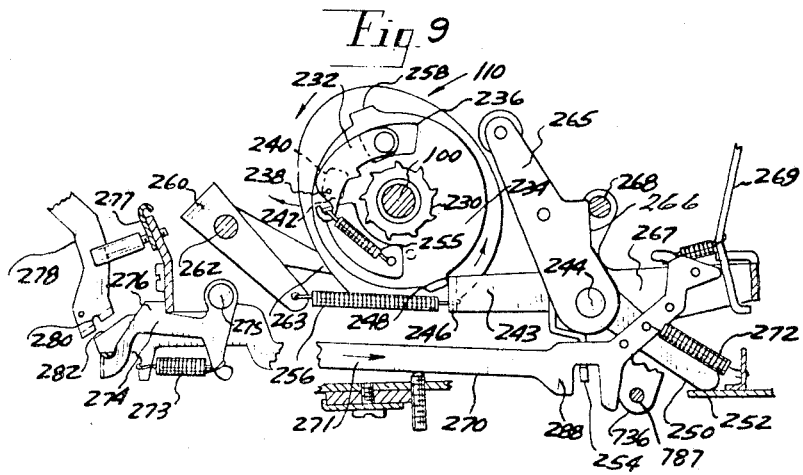
FIGURE 9 is a side elevational view of a portion of the functional operational mechanisms of the apparatus of FIG. 1.
Figure 10:
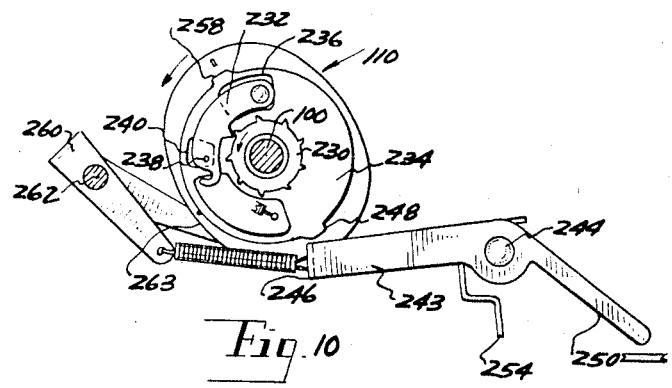
FIGURE 10 is a partial side elevational view of a portion of the mechanism shown in FIG. 9.

In general, all powered functional operations are powered by operational cam shaft 100. The functional operations include space bar, backspace, carrier return, indexing, and shift operations. The tabulator is the only non-powered functional operation and is manually operable. However, during automatic operation of the writing unit, power means are provided to actuate the tabulator as hereinafter described. The space bar, backspace, carrier return, and indexing mechanisms are operated by cam assemblies 110 mounted on the operational cam shaft. One type of cam assembly is a double lobed cam 110, as shown in FIGS. 9 and 10, which is operable in only 180° increments of rotation and powers the space bar and backspace mechanism. Another type of cam assembly (not shown) is a single lobed cam requiring 360° rotation to complete an operation which powers the engaging of the carrier return mechanism and operates the index mechanism.

Since the cam assemblies are selected for operation by identical mechanism, only the double lobed cam assembly 110 is described in detail. The functional operation desired is obtained by a selection system actuated through depressing a desired key lever. The cams of the cam assemblies are normally stationary until connected to the operational shaft 100.

Figure 11:
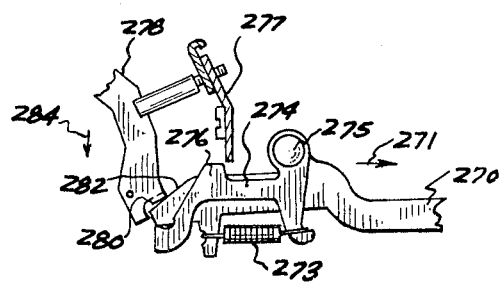
FIGURE 11 is a partial side elevational view of another portion of the mechanism shown in FIG. 9.

Referring now to FIGS. 9–11, cam clutch means in the form of a clutch ratchet 230 is fixed to the shaft 100 adjacent the cam 110. A pawl 232 is pivoted adjacent the ratchet and is pivotable into locking engagement with the clutch ratchet 230 to cause the cam 110 to rotate therewith. A clutch wheel or disc 234 is freely rotatably mounted and controls engagement of the clutch ratchet by the cam pawl. A pawl engaging abutment is formed in the wheel by an enlarged slot 236 and limits movement of the wheel. A pin 238 at the tip of the pawl fits into a hole 240 in the clutch wheel having a beveled control surface 242. When the clutch wheel is held stationary, movement of the cam causes the pin on the pawl to slide up the beveled side of the hole and disengage the pawl from the ratchet. A clutch wheel holding arm 243 is pivoted on a shaft 244. An abutment portion 246 is adapted to engage an abutment 248 provided on the clutch wheel and prevent rotation thereof. A locating arm portion 250 is provided on the other end of the arm 243 to engage a fixed abutment 252 and an actuating lug 254 is centrally connected to the arm 243. When the holding arm 243 is moved downwardly, the clutch wheel will be released. At that time the cam pawl spring 255 pulls the pawl into engagement with a tooth of the clutch ratchet 230 by merely rotating the clutch wheel out of the way. When the holding arm 243 is restored by a spring means 256, the holding arm returns to a position of contact with an abutment 258 on the clutch wheel. The position of the cam assembly is positively located by means of a cam check pawl 260 which is pivoted on a shaft 262 and has a portion 263 adapted to engage and locate the cam 110 in a manner similar to that shown at 264 in FIG. 15.

The functional operation selection mechanisms are supported by a bracket located adjacent the cam assemblies. Actuation of the selection mechanisms controls movement of the associated cam means resulting in the desired functional operation through actuation of a cam follower 265 pivotally mounted on shaft 244 and having a cam surface 266 adapted to actuate a bail member 267 through a pin 268. The bail member is pivotally mounted on shaft 244 and operably engages a link 269. Each selection mechanism comprises an interposer 270 adapted to be slidably displaced to an operative position, in the direction of the arrow 271 in FIG. 9 by actuator means in the form of spring means 272. The interposers are held in an inoperative position by spring means 273 connected to a latch means 274 which is pivoted on the interposer at 275 and has an abutment 276 engageable with a fixed bracket 277. In order to release the interposer for sliding movement, a key lever operated pawl 278 as an abutment 280 engageable with the end 282 of the interposer to cause downward pivotal movement in the direction of the arrow 284 in FIG. 11.

There are four interposers which operate through slots in an operational control bracket. Since the operation is similar only one interposer 270 is shown in FIGS. 9–11 and described in detail. When the interposer is pushed down by selection of a key lever, the interposer latch will be released from the bracket to allow the interposer to be snapped to the rear to obtain one of the functional operations by engagement with the lug portion 254 of the clutch release arm 243 with the lug 288 provided on the interposer. Engagement of the lug portion 254 with the lug 288 causes the clutch release arm 243 to pivot downwardly out of engagement with the clutch wheel 234 to allow the cam to be driven. The bail 267 is in the form of a bell crank adapted to convert the rotary motion of the cam into vertical linear motion at the rear by continuous contact with the cam surfaces 266 provided on cam follower 265. The carrier return and indexing means is operated by the bail 267 which is moved down as the cam follower is forced to the rear by the cam. The indexing mechanism is operated each time the cam operates by a link 269 engageable by the bail 267 near the rear of the cam follower. An interposer restoring means 736 is provided with a pin 787 engageable with the interposer to return the interposer to the latched position. A similar backspace and space bar cam follower is designed to operate the backspace and space bar.

OUTPUT CODE GENERATING MEANS FOR FUNCTIONAL OPERATIONS

Figure 12:
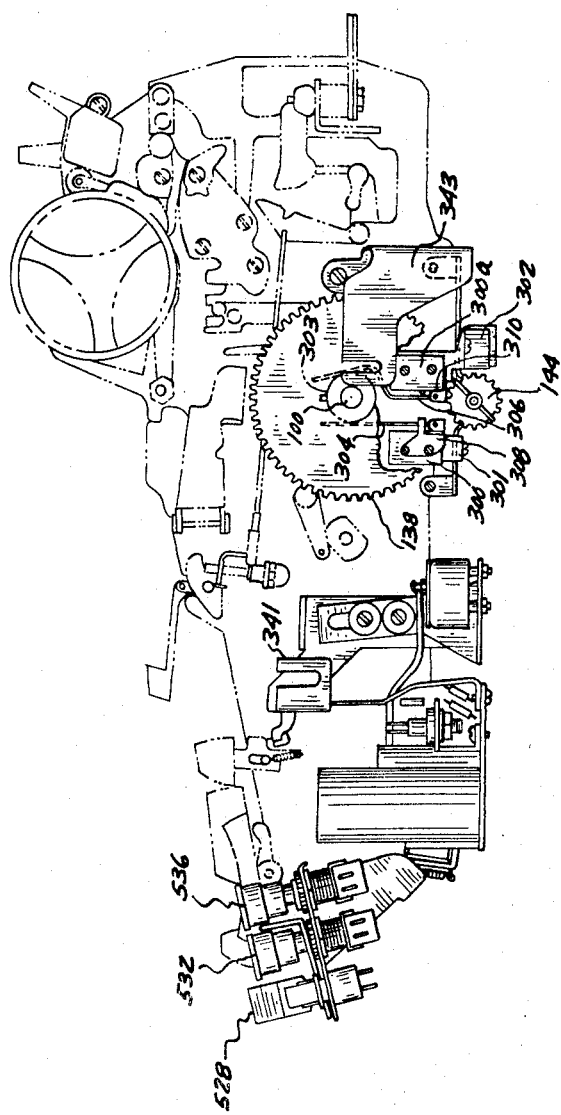
FIGURE 12 is an elevational view with parts removed, of one end of the apparatus of FIG. 1.

Referring now to FIGS. 8, 12 and 26, it may be seen that the aforesaid functional operations of the typewriter may be translated into coded punch-operating output signals by means of electrical signal generating means in the form of switches 300–300e, similar to those previously described, which are fixedly supported by suitable bracket means mounted on the frame of the writer unit adjacent to the various functional operation mechanisms. For example, as shown in FIG. 12, switches 300–300a are mounted on brackets 301, 302 adjacent a shift cam 303 on operational shaft 100. Each of the switches includes switch actuating arms 304, 306 which extend upwardly into engagement with the cam 303 and are pivotally supported by brackets 308, 310, for output circuit energizing movement in response to movement of the cam. The other functional operation mechanisms may similarly be utilized to actuate the switches by cam means. The manually operable tabulator may be operatively connected to its switch in any suitable manner through direct engagement with a portion of the selection or operation mechanism 311 as shown in FIG. 8. Thus, the selection of any of the powered functional operations by depressing a key lever and a key lever pawl 278 creates a coded signal through actuation of the associated switches by the seleceted functional operation mechanism. It is to be understood that a switch is provided for each of the functional operations including the shift switches 300–300a, tab switch 300b (FIG. 8), a backspace switch 300c, a space bar switch 300d, and a carrier return switch 300e.

Figure 13:
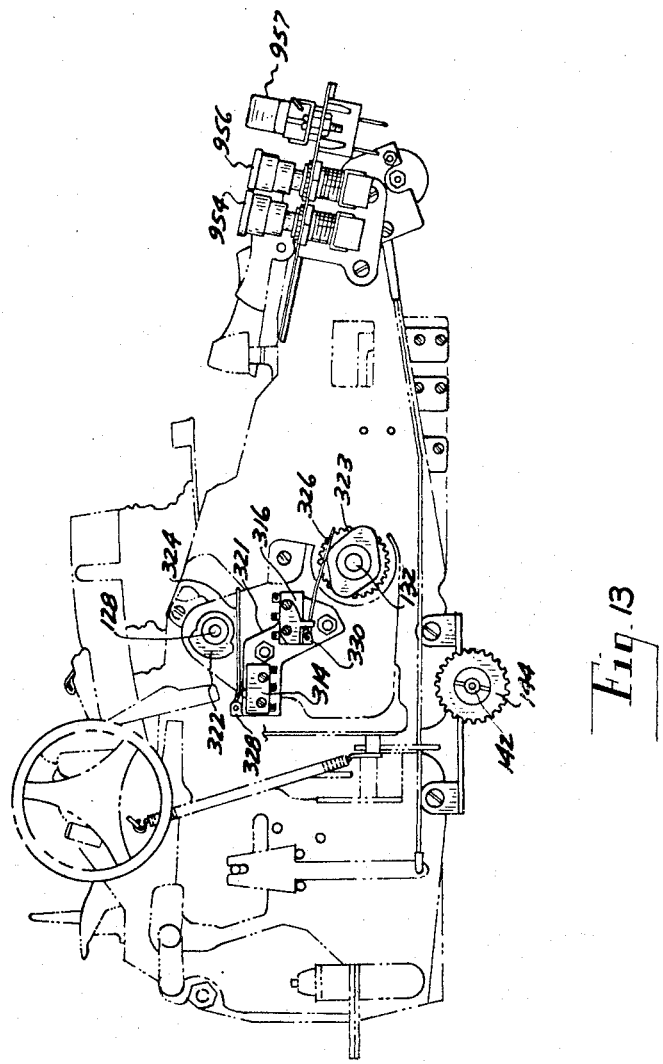
FIGURE 13 is an elevational view, with parts removed, of the other end of the apparatus shown in FIG. 1.

Additional switches of similar design are associated with the functional operational mechanisms and the print operation mechanism for purposes to be hereinafter described in detail. For example, as shown in FIG. 13, switches 314 and 316 are mounted on a bracket 321 adjacent a character interlock cam 322 on shaft 128 and a cycle cam 323 mounted on shaft 132 which provides operation cycle signal generating means. Each of the switches is provided with elongated actuating arms 324, 326 which extend outwardly for switch actuating engagement with the cam. The actuating arms are pivoted on brackets 328, 330 and are adapted to actuate the switches by pivotal movement relative thereto. The switch 316 is associated with the punch control system and the switch 314 is associated with the input control system as hereinafter described.

PUNCH MEANS

Figure 14:
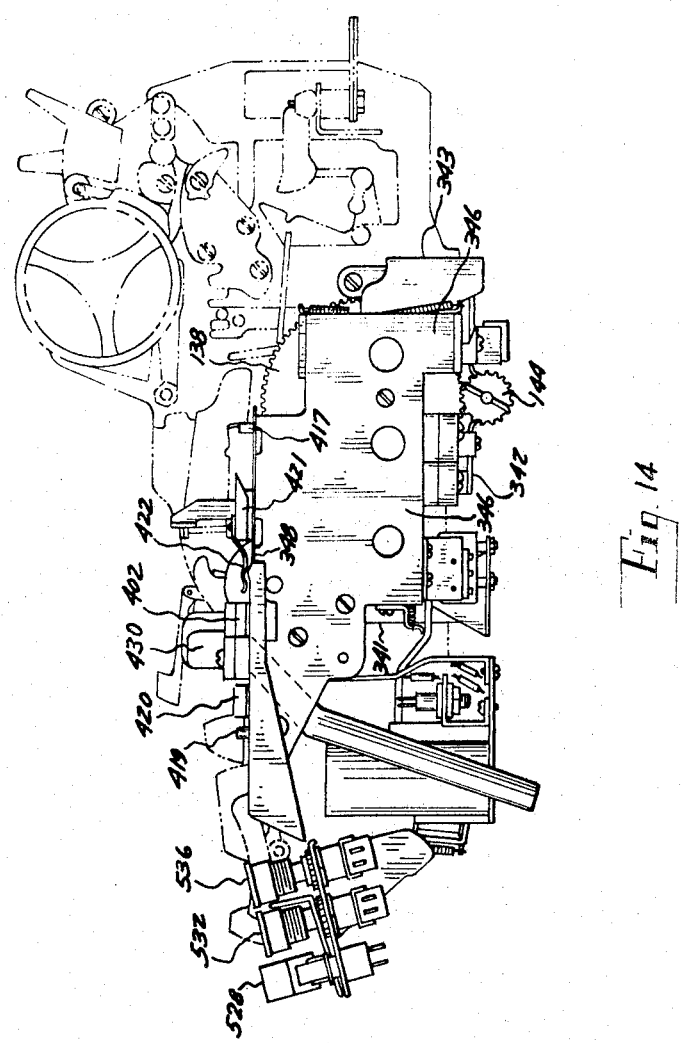
FIGURE 14 is an elevational view of one end of the apparatus shown in FIG. 1 with parts removed to show punch apparatus.
Figure 15:
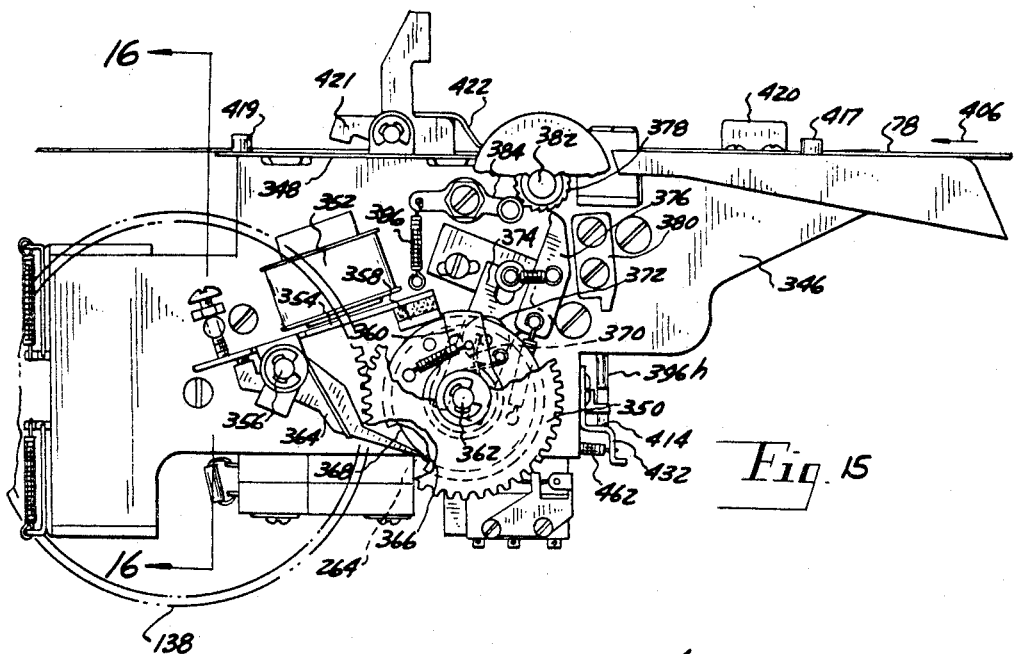
FIGURE 15 is another side elevational view of the punch apparatus in FIG. 14.
Figure 16:
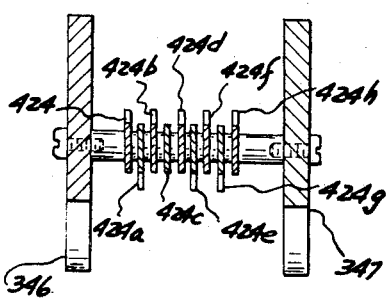
FIGURE 16 is a sectional view taken along the line 16—16 in FIG. 15.
Figure 17:
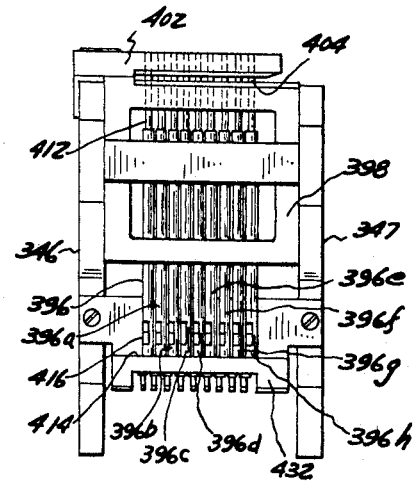
FIGURE 17 is an end view of the apparatus in FIG. 15.

Referring now to FIGS. 14–25, a punch means mounted on the right side of the writing unit is shown. A plurality of punch supporting bracket members, such as 341, 342, 343, 344, may be suitably connected to the typewriter frame as shown in FIG. 12 and FIG. 14. The punch components are mounted in a separate frame comprising spaced side plates 346, 347, and a top plate 348 as shown in FIG. 17. The punch drive mechanism is connected to the writing unit drive through the gear 138 and a drive gear 350, as shown in FIG. 15. Since the gear 138 is continually rotating, the gear 350 also continuously rotates. Consequently, a conventional one-way clutch mechanism is provided to actuate the punch in timed sequence with the writing unit so that each of the printing operations and/or the functional operations performed on the writing unit will result in actuation of the punch. The clutch mechanism includes a solenoid 352 which controls a latch arm 354 pivoted at 356. An abutment portion 358 is adapted to engage a clutch arm 360 pivotally mounted on a shaft 362 which is rotatably supported and extends between the side plates 346, 347.

A holding and restoring mechanism 364 is pivotally mounted on the shaft 356 and is engageable with an abutment 366 provided on a clutch disc 368 to properly locate and hold the clutch mechanism. Energization of the solenoid 352 actuates the latch arm 354 and permits clutch arm 360 to rotate. A cam 370 mounted on shaft 362 is rotated and a cam follower 372 mounted on a slide block 374 is outwardly displaced. The cam and cam follower arrangement is identical to the cam and follower arrangement more clearly shown in FIG. 29. The slide block 374 moves upwardly and displaces a pawl 376 mounted thereon into driving engagement with a ratchet wheel 378 and into abutting engagement with a pawl stop block 380. The ratchet wheel is fixedly connected to a shaft 382 extending between the side plates 346, 347 and is adapted to impart rotary movement thereto when driven by the pawl 376. A detent follower 384 is biased into engagement with the ratchet by a spring element 386 to control rotation of the ratchet and the shaft.

Figure 18:
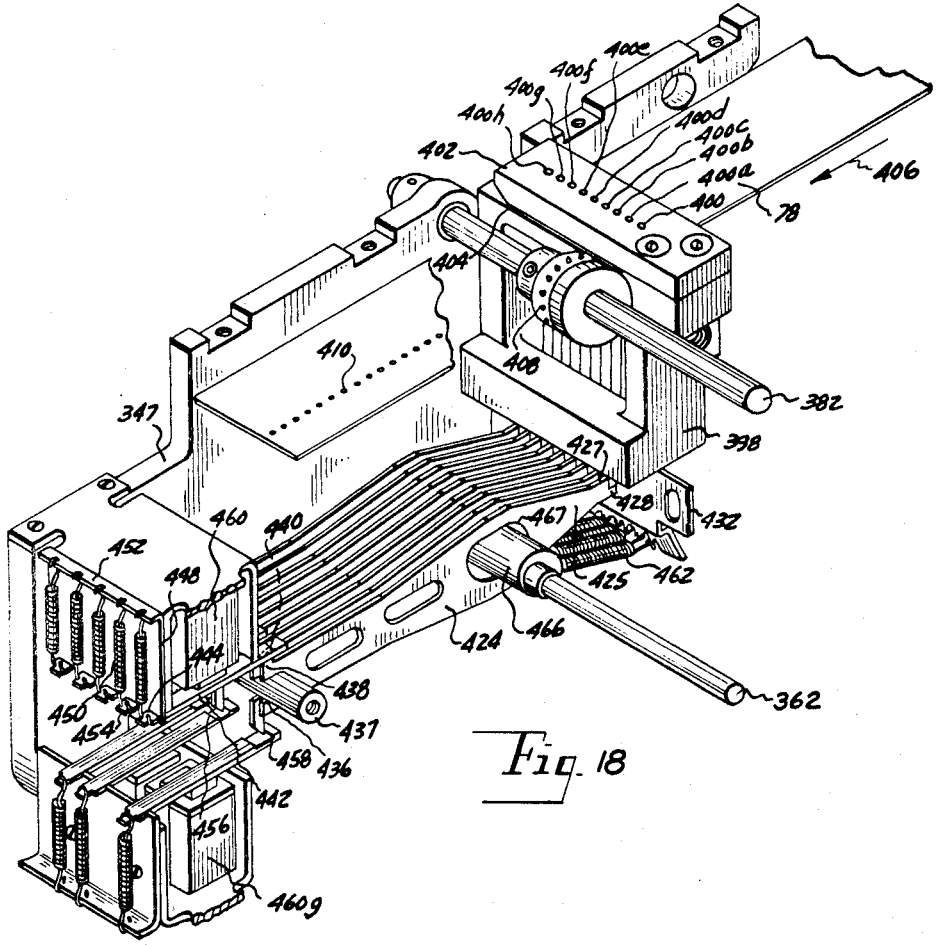
FIGURE 18 is a perspective view of the punch apparatus.

Referring now to FIGS. 17 and 18, the punch comprises a plurality of punch pins 396–396h which are reciprocably mounted in a frame 398 and are adapted to be selectively driven upwardly into punch holes 400–400h provided in a die plate 402 which is supported in spaced relation to the top of the punch frame 398 to provide a tape slot 404. The blank tape 78 to be coded is threadably receivable within the gap 404 and is driven in the direction of the arrow 406 by means of a sprocket wheel 408 mounted on the shaft 382. The sprockets of the sprocket wheel 408 are aligned with a centrally located punch 396c and punch hole 400c which continuously form drive holes 410 in the tape in alignment with and adapted for association with the sprocket wheel 408. The upper ends of the punches are provided with perforating portions 412 and the lower ends of the punches are seated on a flat abutment surface 414. Intermediate the ends of the punches, a series of actuating slots 416 are formed longitudinally of the punch shaft and located in positions substantially parallel to the path of movement of the tape 78 as indicated by the arrow 406.

Figure 19:
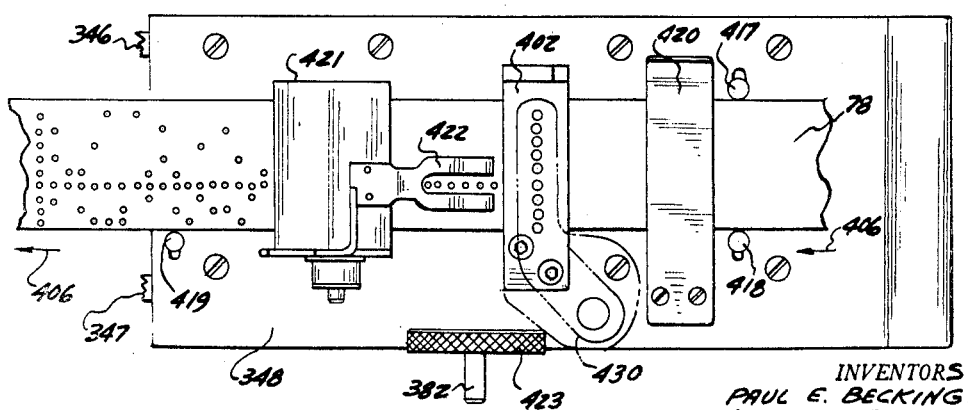
FIGURE 19 is a plan view of the punch apparatus.
Figure 23:
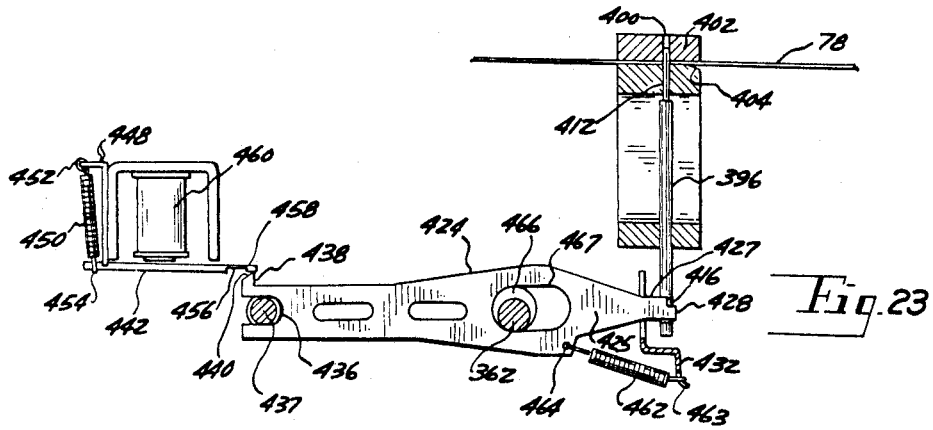
FIGURE 23 is a side elevational view of the apparatus shown in FIG. 22 in a subsequent operational position.

As shown in FIG. 19, the frame includes an upper plate 348 having guide pins 417, 418, 419 and overlying plates 420, 421. A spring finger means 422 mounted on the plate 421 is cooperably associated with the sprocket wheel to obtain driving engagement between the sprocket wheel and drive holes. A hand knob 423 may be provided on the end of shaft 382 to facilitate tape insertion. A waste paper removing means 430 (FIGS 14, 19) is associated with the die plate to remove the severed paper particles.

Referring now to FIGS. 16 and 18, the punches are adapted to be actuated into and through the tape by means of interposers 424–424h. A code interposer is provided for each of the eight code punches and a special interposer is provided for the drive hole punch. Those portions 425 at one end of the code interposers adjacent the punch members are notched or stepped to define an abutment 427 having a maximum height and an end portion 428 of reduced height for a purpose to be hereinafter described. The height of the portion 427 is substantially equal to the height of the punch slots 416 and the height of the portion 428 is substantially less than the height of the punch slots to provide clearance between the punches and the interposers during some phases of operation. The end portion of the drive punch interposer 424c has a uniform height substantially equal to the height of its associated punch slot for continuous engagement with the punch. The notched ends of the interposers are slidably mounted in suitable slots provided in a comb member 432 and are slidable relative thereto into and out of a coding position.

The other ends of the code interposers are identical and have axially extending slot portions 436 which are slidably and rotatably received on a support shaft 437. It is to be understood that each interposer has similar associated parts as hereinafter described. A latch lug 438 having a beveled surface 440 is formed on the end of the interposers and extends outwardly for latching engagement with a latch bar 442. Some of the lugs extend in opposite directions to conserve space as hereinafter described. The latch bar is pivotally supported in a slot 444 in a comb member 448. Each latch bar is provided with a vertically extending spring 450 secured on a flange 452 at the other end of the comb 448 and engaged at the other end with a reduced end portion 454 of the latch bar. Consequently, a biasing rotative force is exerted on the end of the latch bars which tends to pivot the latch bar in the comb slot. The other end of the latch bar is provided with a notched portion 456 to form an abutment 458 adapted to engage the interposer lugs 438.

In the normal non-coding position of the interposers shown in FIGS. 18 and 20, the latch bar engages the interposer lug at 458, and the springs 450 exert forces in the direction of the arrow 459 to secure the latch bar in restraining engagement with the interposer. Although the latch bars may be mounted above and below certain of the interposers to conserve space, the actuation is identical. Output signal actuated solenoid devices 460–460g are controllably associated with each latch bar and are mounted in two groups in vertical stacked relationship above one another to conserve space. Energization of the solenoids causes movement of the latch bars away from the interposers, upwardly or downwardly, to release the interposers. When the interposers have been released, a previously tensioned spring means 462 connected at one end 463 to the comb member 432 and at the other end 464 to the interposers causes sliding displacement of the interposers 424 from the non-coding position to a coding position. In the coding position, the interposers are free to be driven in a predetermined pattern by a drive cam 466 mounted on shaft 362 and extending through elongated aligned slots 467 in each of the interposers.

Figure 25:
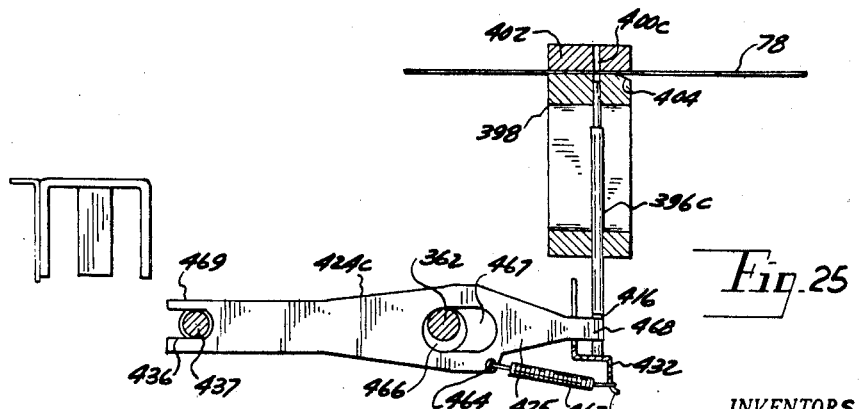
FIGURE 25 is a side elevational view of another portion of the punch apparatus.

As shown in FIG. 25, the drive hole punch interposer 424c has a blunt nose portion 468 and flat rear end 469 without a latch lug, associated latch bar or solenoids. The interposer is constantly held in an operative position by one of the springs 462.

PUNCH MEANS OPERATION

Referring now to FIGS. 20–24, the actuation of the punch means is shown in a step-by-step sequence by reference to a single interposer 424. In the normal position of the punch apparatus, shown in FIG. 20, the lug 438 is engaged in the slot 456 of the latch bar 442 and the interposer 424 is held against the bias of spring 462. The shaft 437 is located at the right-handmost portion of the slot 436 and the cam 466 is spaced from the rear end of the slot 467 as shown by gap 470. When the solenoid 460 is energized, the latch bar 442 moves upwardly in the direction of the arrow 472 as seen in FIG. 21 to release the interposer 424. The interposer is simultaneously moved in the direction of the arrow 474, FIG. 21, by the spring 462 a distance sufficient to locate the nose portion 427 within the confines of the slot 416 provided in the punch pin 396. It will be noted that in the non-coding position shown in FIG. 20, the nose portion surface 427 of the interposer is clear of the punch slot 416 as indicated by the gap 476 (FIG. 20) even though the reduced end portion 428 is within the slot.

Figure 24:
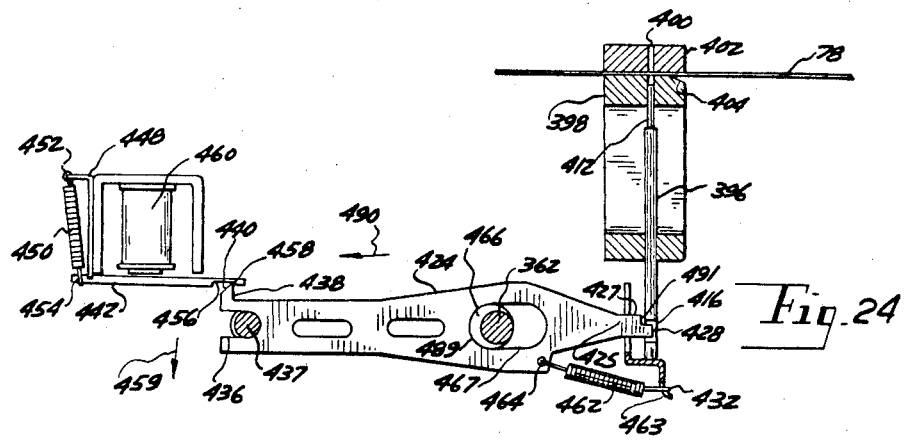
FIGURE 24 is a side elevational view of the apparatus shown in FIG. 23 in a subsequent operational position.

When the interposer has been released and slidably displaced by spring 462 as shown in FIG. 21, the cam 466 and the side surface of the slot 467 are moved into abutting engagement as indicated at 482. At the start of an operational cycle, the high point of the cam is located approximately at bottom dead center. As the shaft 362 rotates counterclockwise from the position of FIG. 21 to the position of FIG. 22, the cam is gradually moved into lifting engagement with the top surface of the slot as indicated at 484 in FIG. 22. The spring 462 maintains the side surface of the slot 467 in constant engagement with the cam. In FIG. 22, the nose portion surface 427 is moved into full engagement with the punch in the punch slot at 488. Consequently, the top of the nose portion is fully engaged with the top of the slot 416 in the punch and continued rotation of the cam results in lifting of the punch toward the tape. The interposer movement is accommodated by the slot and shaft connections 436, 437. When the shaft 362 has completed 180° fo rotation, FIG. 23, the high point of the cam is engaged at the upper surface of the slot and the punch portion 412 is fully extended and has moved through and perforated the tape. The tape has previously been positioned for the punching operation by means of the ratchet wheel 378 and the drive shaft 382 shown in FIG. 15. During the next 90° of rotation of the shaft 362, the high point of the cam portion moves rearwardly into engagement with the end of the slot 467 at 489 as shown in FIG. 24. It is to be noted that the bottom of the nose portion is fully engaged with the bottom of slot 416 to provide a positive punch return. Consequently, the punch is positively retracted as the cam moves from the position of FIG. 23 to the position of FIG. 20. The interposer is moved rearwardly in the direction of the arrow 490 to relocate the lug 438 in latching engagement with the latch bar 442. As the interposer approaches the latch bar, the inclined rear surface 440 of the lug engages the latch bar and biases it upwardly until the lug moves into the slot. The solenoid 460 has previously been deenergized and the spring 450 pivotally biases the latch bar 442 downwardly in the direction of the arrow 459 (FIG. 24) to cause latching engagement between the lug and the slot. The nose portion 425 of the interposer is gradually moved away from the slot 416 and the punch 396 is positively returned to its rest position on the comb 432 as shown in FIG. 20. Even though the top surface 427 of nose portion 425 of the interposer may become misaligned relative to the top of the slot 416 as shown at 491, the notch in the interposer provides sufficient clearance for the end portion 428 to remain in the slot without interferring engagement at the top of the slot. During the final 180° of rotation of the shaft 362, the interposer and the punch are positively returned to the original positions shown in FIG. 20. The clutch mechanism is actuated to engage the pawl 376 with the ratchet 378 (FIG. 15) and advance the tape one code column so that the tape will be in position for the next coded perforation recording the next operational sequence of the writer unit.

It will be understood that only those interposers having energized solenoids and released latch bars are operably engaged with the associated punches during a particular coding cycle. The other interposers are driven through the same cycle as the released interposers because of the continuous engagement of the cam 466 in the aligned slots 467. However, only the nose portions 428 of the latched interposers are located within the slots 416 of the associated punches and the vertical movement imparted to the interposers by the cam is less than the distance between the upper surfaces of portions 428 and the slots so that no actuating engagement takes place between the interposers and the punches. The movement of the latched interposers is accommodated at the latch end by the freely movable latch bars 442 which are constantly biased into engagement with the lugs by the springs 450.

TRANSMITTER CONTROL SYSTEM

Referring now to FIG. 26, a circuit diagram schematically illustrating the transmitter control system for the punch means is shown. The punch means is powered by direct current obtained from a conventional alternating current source 500 through a secondary winding 502 and a full wave bridge rectifier 504 having a filter 506. The eight coded output signal operated solenoids 460–460g and the punch clutch solenoid 352 are connected in parallel between lines 510, 512 by lines 516–524 to provide individual circuits for each. A master on-off switch 526 is provided in line 510 which is operable by a control button 528 in the punch control cluster. The clutch solenoid is also connected by a line 530 to each of the individual code circuits for energization every time any one of the code circuits is energized. The clutch solenoid circuit may be separately energized by actuation of a feed button switch 531 which is operable by a control button 532 in the punch control cluster. Solenoid 460g provides a delete signal to indicate that a code column is not correct, and is energizable by actuation of a switch 534 operable by a delete button 536 in the punch control cluster.

Each of the other solenoid circuits are code circuits which are energized in selected patterns according to writer unit operation. The code circuits are divided into first circuit means comprising print operation transmitter circuitry and second circuit means comprising functional operation transmitter circuitry. All of the print operation circuits are controlled by the cam operated cycle switch 316 in line 522 of operational cycle transmitter circuitry. Selection of particular print operation circuits is obtained by the six selector switches 200–200e which are shown in parallel on a switch line 538. As hereinbefore described, the switches 200–200e are operable selectively and automatically by the writing unit mechanism. Accordingly, energization of any of the N output devices, in the form of solenoids 460–460e, in response to print operations, is dependent upon actuation of a particular individual print switch and, in addition, the cycle switch 316, which also energizes the additional output device 460f connected in a third circuit means.

The functional operation circuits are selectively energized by the aforedescribed functional operation switches 300–300e. Actuation of switch 300b by the tab mechanism energizes solenoid 460, actuation of switch 300e by the carrier return mechanism energizes solenoid 460a, actuation of switch 300a by the shift mechanism energizes solenoid 460c, actuation of switch 300 energizes solenoid 460d, actuation of switch 300c energizes solenoid 460e. In order to limit the energization period of solenoid 460 in response to actuation of switch 300b, which may vary according to length of time of manual operation of the tabulation button, a condenser 540 and charging circuit 542 are provided to only momentarily energize the solenoid 460 when switch 300b is actuated regardless of the length of time of actuation. It will be readily apparent to those skilled in the art to which this invention relates that an extremely simplified punch control system has been provided wherein solenoids controlling the punches are selected by simple switch means operably connected directly to the various operating mechanisms of the writer unit to provide a coded record of the writer operation on a recording means.

READER MEANS

Referring now to FIGS. 27–30, the reader means for the subject writing system is shown to comprise a frame formed by spaced side plates 552, 554 and a top plate 555. The frame is suitably secured to the side of the writer unit on the frame thereof opposite the punch means by bracket members 556, 558 or the like. A reader drive shaft 560 is rotatably supported between the side plates and supports a reduction gear 561 which is driven by reader pinion 144. The cam 562 is permanently connected to the shaft 560 which is periodically engageable with reduction gear 561 by operation of a spring clutch means 564. The clutch means includes clutch release mechanism comprising a locking arm 566 and an associated latch 568 which is abuttingly engageable therewith in the disengaged position of the clutch. The latch is pivoted at 570 for movement to a released position in response to energization of a clutch operating means in the form of a control solenoid 572. A disc 574 is mounted on the shaft 560 and has abutment means 576 adapted to engage a spring biased follower 578 which is also pivoted at 570. When latch 568 is released, the clutch engages to drive the shaft 560 and cam 562 one revolution.

A cam follower 580 is connected to a slide block 582 which is reciprocably driven by cam rotation relative to a guide post 584. A pawl block 586 is mounted on the slide block and includes a pawl portion 588 adapted to engage a ratchet wheel 590 rotatably mounted on a shaft 592. A pawl stop 584 and a ratchet follower member 596 are associated with the mechanism. The shaft 592 supports a sprocket wheel 598 within the frame in a centrally located slot 600, as shown in FIG. 30, provided in the upper plate to provide feed means for moving the coded record in step-by-step fashion from code column to code column through the reader. The sprocket wheel is rotated one step by action of the cam follower 580 during the movement of the drive shaft 560. A downwardly curved tape guide surface 602 is located adjacent the sprocket wheel and a spring guide plate 604 having finger portions 606, 607, shown in FIG. 28, is associated therewith to maintain driving engagement between the drive holes on tape 76 and the sprocket wheel to insure uniform and accurate movement of the tape through the reader. Additional tape guide means include a guide pin 608 and cover plates 609, 610. A hand wheel 611 is mounted on the end of the shaft 592 for manual operation of the sprocket wheel.

Translation means capable of generating coded input signals in response to the information stored on the tape record of writing unit operation are mounted on the frame. In the preferred embodiment, referring to FIGS. 28 and 30, the translation means comprise light source means 612 and photo cell means 613 energizable thereby. The light source means may be mounted in spaced relation above the plate 555 on a bracket 614 including guide plate 609 which provides a tape slot 615 and an elongated light port 616 aligned with a plurality of holes 617–617g in the plate forming a code column. Each code channel has a corresponding hole and the width of the port 616 is sufficient to receive a band of light approximately equal to the width of a column of code holes in the tape.

The light source means comprises one or more bulb members 618 which are fixedly secured in parallel alignment on a support flange 619. As may be seen in FIG. 28, four bulbs are provided in spaced relation above a light concentrating means 620 which comprises a lens of translucent material adapted to project a continuous band of light substantially confined to the width of a code column and aligned with the holes 617–617g. Individual light responsive signal generating means in the form of photo cell means 622–622g, only one of which is shown in FIG. 30, are mounted in each of the holes and supported beneath the plate 555 by a bracket 624 or the like. In the preferred embodiment, the photo cell means are in the form of conventional photo diode tubes having the tips 626 projecting through the holes and extending upwardly into the plane of the tape to cause slight upward displacement thereof as shown at 628. Consequently, as the tape passes over the upwardly extending tips, the code holes in the tape are exposed more directly to the light beam which results in more accurate reading of the tape and enables the tape to be passed through the reader at extremely high rates of speed. Furthermore, the constant friction of the tape on the surface of the tube tips 626 during tape movement keeps the tip clean and prevents any malfunction due to dirt accumulation or debris which might otherwise prevent light from reaching the photo cell means even though a code hole was present.

PRINT OPERATION SIGNAL INPUT MEANS

Referring now to FIGS. 8 and 31–41, signal input means 632 (FIG. 8) for translating the print operational signals obtained from the coded tape in the reader means into equivalent writing unit operation are shown. The signal input means are shown in conjunction with the interposer 160 and the bails 170, 176–176e of the writing unit in FIG. 31. As may be recalled from the previous description, all of the printing operations of the writer unit are obtained through actuation of the selector bails 176–176e by depression of particular print keys resulting in movement of the interposers 160–160e to position lugs 166–166e in particular relationship to the selector bails for subsequent actuation thereof.

In order to actuate the writing unit in response to the signals obtained from the coded tape, an input code selector interposer 633 is provided for the cycle clutch bail 170 and N input code selector interposers 634–634e are provided for each of the six selector bails 176–176e to obtain actuation of bails in a predetermined pattern as originally selected by depression of certain key levers during coding of the tape. Since the interposers are substantially identical in construction, identical reference numerals are used to refer to identical portions of each interposer and only the interposer 633 is described in detail. Each selector interposer is provided with an elongated slot 635 on one end in which the pivot shaft 162 is received. A spring lug 636, a latch lug 637, a restorer lug 638, and a cam lug 640 are integrally formed on each interposer. Each interposer is further provided with an upwardly extending bail lug 642–642f intermediate the ends thereof. The lugs are variably located for engagement with one of the bails. The cycle clutch bail interposer 633 shown in FIGS. 31–33 is provided with a cycle clutch bail engaging lug 642.

Each interposer is provided with a latch means which is selectively operable by a coded input signal. The latch means is supported on the writing unit frame by suitable bracket means 644, 646 and includes a pivotally mounted latch bar 648. A latch slot 650 is formed at one end and the other end is pivotally supported at 652 in a slot in a comb plate 654. Each latch bar is connected at 656 to a spring element 658 which exerts a pivotal force on the latch bar and is connected at the other end 660 to the end of the comb 654. Print operation controlling devices, comprising a bank of solenoids 662–662f are mounted adjacent the latch members on the bracket 644 and are selectively energized to cause rotation of the latch bars against the bias of springs 658. Spring elements 666 and 668 are mounted on a shaft 670 supported in an extension 672 of the bracket 644. The other ends of the springs are connected at 674 and 676, respectively, to the lugs 636 and 637 of the interposer to provide operating means therefor. The springs act in combination to exert forces imparting desired movement to the interposers. When the latch bar 648 is released from engagement with the end 678 of lug 637, the interposer moves from the inoperative position shown in FIG. 31 to the operative position shown in FIG. 32 in abutting engagement with one of the lobes of the filter shaft 132 at 679. A bell crank restoring means member 680 is pivoted on a shaft 682 supported on the bracket means 683 and has lift arm portions 684, 684a, FIGURE 35, a transverse abutment portion 685, and a cam arm portion 686 adapted to engage the filter shaft at 688. A spring 690 biases the cam arm into engagement with the filter shaft. In the inoperative latched position of the interposer, the cam lug 640 is spaced a sufficient distance from the filter shaft, as indicated by the gap 692, to prevent operative engagement therebetween.

In operation, energization of the cycle clutch solenoid 662f moves the latch bar 648 in the direction of the arrow 694 (FIG. 32) to release the latch lug 637 from engagement in the slot 650. Release of the latch bar results in pivotal downward movement of the interposer about the shaft 162 in the direction of the arrow 696 (FIG. 32). The downward movement of the interposer causes engagement of the cycle lug 642 with, and actuation of, the cycle clutch bail 170 at 698. Cam lug 640 is moved into engagement with the filter shaft 132 at 679. Rotation of the filter shaft 132, in the direction of the arrow 700 in FIG. 33, drives the interposer 633 away from the filter shaft in the direction of the arrow 702. The interposer slides rearwardly on the shaft 162 in the slot 635 and the cycle clutch bail 170 is cleared from engagement with the cycle clutch bail lug 642. Springs 666, 668 are extended as the lugs 636, 637 move rearwardly. The latch bar 648 is engaged by return lug 638 and moved away from the solenoid 662f. When the cam peak 135 clears the cam lug 640, the springs return the interposer to the position shown in FIG. 32 and the cam arm portion 686 is engaged by the opposite cam peak 136, as shown in FIG. 34, to rotate the lift arm 684 upwardly resulting in upward movement of the interposer to return the latch lug tip 678 into the slot 650 of the latch bar and the interposer to the position of FIG. 31.

Referring now to FIG. 35, it may be seen that the six character selecting interposers 634–634e are supported in parallel spaced relation with the cycle clutch bail interposer 633 in a series of guide slots provided in the upper portion of bracket 644. The restorer 680, FIGURE 31, is in the form of a U-shaped member having spaced lift arm portions 684 and 684a, FIGURE 35, to support the transversely extending abutment portion 685, which is adapted to operate all of the interposers. The varying positions of the bail lugs are shown in FIGS. 36–41 and include the lugs 642a–642f provided for each of the bails 176–176e, respectively. The interposers are otherwise identical to the interposer 633. The character selection bails are operated by rotation of the filter shaft whenever the corresponding interposer solenoid has been energized to release the interposers for movement into operative engagement with the filter shaft. The unlatched interposers remain in a spaced inoperative position relative to the filter shaft and the associated bails are not actuated during rotation of the filter shaft.

The bank of interposers, interposer latches and interposer return mechanism are mounted at the bottom of the typewriter unit in a convenient place, as at 632 in FIG. 8, for actuation of the various selector bails and for association with the filter shaft. It may thus be appreciated that the input interposers are capable of operating the writing unit mechanism through the selector bails 176–176e without actuation of any of the writing unit interposers 160, key levers 150, or associated mechanisms. Accordingly, when the writing unit is being operated automatically through the input signals obtained from the coded record, none of the keyboard selection mechanisms are actuated nor is there any movement of selection mechanisms except for the actuation of the selector bails and associated printing mechanisms.

FUNCTIONAL OPERATION SIGNAL INPUT MEANS

Referring now to FIGS. 8, 42 and 43, a second group of mechanisms 730 (FIG. 8) for translating the signals obtained from the coded record relating to the space bar, backspace, carrier return and index functional operational of the typewriter are provided. The mechanisms are associated with portions of the operational selection mechanisms of the writing unit previously described with reference to FIGS. 9–11 including interposers 270–270c, interposer return mechanisms 736, and interposer latches 274. As may be recalled by reference to FIGS. 9–11, the interposers 270–270c are adapted for operation by depression of selection key levers and pawls 278 resulting in release of the associated latch 274 and permitting the interposer to be moved rearwardly into an operational position.

In order to obtain a similar operation in response to coded input signals obtained in the receiver, a code translating mechanism is mounted beneath the typewriter adjacent each of the functional operation selecting interposers on suitable bracket means 740, 741, and 742 which are suitably secured to the writing unit frame. Since the mechanisms for each of the interposers 270–270c is identical, only the mechanism associated with interposer 270 is described in detail. Each mechanism comprises a latch release means lever 744 which is pivoted at 746 and provided with a latch engaging lug 748 on one end. A beveled nose portion 750 is provided on the other end for engagement with a latch bar means 752 having a latch slot 754 formed at one end. The release lever is slidably mounted in a comb portion 756 on the bracket 740 and a spring means 758 biases the lever in the direction of arrow 760. Latch bar 752 is pivotally supported in a slot on a comb element 762 at 764. A spring means element 766 is secured at 768 to the end of the latch bar to exert a force in the direction of arrow 770 and cause engagement with the nose 750. Input signal actuable functional operation controlling devices in the form of solenoids 772–772c are provided to actuate the latch bars against the bias of springs 766 and release the levers 744 resulting in pivotal movement of the levers under the influence of springs 758. Abutment 748 is moved into engagement with the latch 274 and disengages lug 276 to permit the interposer 270 to slide into the operative position shown in FIG. 43.

A restoring means is also provided and comprises a return link 776 loosely connected at one end 778 in slots 780 in the release levers. The other end of link 776 is pivotally connected at 782 to a lever 784 which is pivotally mounted on bracket 742. The other end 786 of lever 784 is adapted to be actuated by a pin 787 mounted on the restorer 736 in the direction of arrow 788 during restoration of the interposer 270. A spring 789 biases the lever into engagement with the pin 787. Rotation of link 784 causes movement of the link 776 in the direction of the arrow 790 and return movement of the latch bar 744 in the direction of arrow 792 from the release position shown in FIG. 43 to the latch position shown in FIG. 42. It should be understood that each of the space bar, backspace, carrier return and index functional operation selection interposers of the writing unit are actuated in a similar manner by similar solenoids and linkages.

Referring again to FIG. 8, an upper shift rotary solenoid 793 is directly connected to the writing unit shift mechanism for operation thereof. A lower shift solenoid 794 is also associated with the writing unit shift mechanism and acts as a lock when the upper shift solenoid is energized and as a release when energized. A tab actuating rotary solenoid 796 is mounted adjacent the writing unit tab mechanism and is directly connected thereto by linkage 798. Accordingly, the functional operations of the writing unit are duplicated in response to signals obtained from the coded record without actuation of any of the other selection mechanisms of the writing unit and, as with the print selection keys and key levers, none of the functional selection keys or key levers are operated except for the manual tab key lever.

INPUT SIGNAL RECEIVER CONTROL SYSTEM

Referring now to FIG. 44, the receiver control system for translating the information stored on the coded record means into corresponding writer unit operation is diagrammatically illustrated. The power source 500 of alternating current is converted to direct current by conventional bridge rectifiers 812, 814. Each of the photo diode tubes 622–622g is associated with individual control device actuating amplification circuit means 816–816g. Since the circuit means are identical, only one tube 622 and one circuit 816 are shown for illustrative purposes. Each circuit controls energization of an associated control device in the form of relays 818–818g which conditions the control circuitry of the various input signal actuated solenoids for selective energization. The relay contacts provide print operation selection means 820, 822, 824, 826, 828, 830, functional operation selection means 820a, 822a, 824a, 826a, 828a, 830a, and operational cycle clutch selection means 832. For convenience of description, the code perforations on the tape may be divided into longitudinally extending code channels 1–8 and transverse code columns 10 as shown in FIG. 28. For example, relay coil 818 is energized by the number one code channel circuit 816 and actuates contacts 820 and 820a controlling solenoids 662 or 796. Similarly, the number two code channel circuit 816a actuates contacts 822 and 822a. The number three code channel circuit 816b operates contacts 824 and 824a. The number four code channel circuit operates contacts 826 and 826a. The number five code channel circuit operates contacts 828 and 828a. The number six code channel circuit operates contacts 830, 830a. The number seven code channel circuit operates contacts 832, 832a, 832b. The number eight code channel circuit operates contacts 834. Although only one photo diode 622 and amplification circuit 816 are shown, it is to be understood that there are eight such photo diodes and amplification circuits corresponding to the eight channel codes utilized in the preferred embodiment.

The photo diode circuits are connected to the power source through lines 835, 836. As shown in FIG. 30, timing means in the form of a plurality of control cams 837, 838, 839 are mounted on the reader drive shaft 560 to control the automatic typewriter operation. The cams actuate associated timing switches 837a, 838a, 839a shown in FIG. 44. Switch 837a provides record movement correlated means which controls energization of the photo diode circuits and is operable to the open position by the cam 837 mounted on the reader shaft 560 during movement of the tape and is closed when the reader shaft 592 is at rest. After the reader shaft 592 is at rest. After the reader clutch is energized and the shaft 560 starts to turn to advance the tape, the switch 837a is opened as the cam 837 rotates prior to actuation of shaft 592 and remains open during advance of the tape so that the photo diode circuits will not be operated thereafter until the tape is advanced to the next code column. The amplification circuits are in the form of printed circuits mounted on printed circuit boards 841–841g, as shown in FIG. 46, and include a pair of transistors 842, 844 which are connected in parallel between lines 835, 836. The transistors provide a control means 844 having a current conducting state and a non-conducting state and an amplification means 842 for changing the state of control means 844 which are responsive to changes in resistance caused by light changes on the photo diode tube 818 to cause energization of the coil 818 through lines 845, 846 in a conventional manner. As shown, the photo diode circuit 847, the control cam circuit 848, the amplification circuit 816, and the relay circuit 849 are adapted for jack and plug connection facilitating assembly, minimizing parts and conserving space.

The control system further includes manually operable means to start and stop operations of the input means and automatic means to continuously operate the writer unit in proper sequence, after manual start, in response to signals generated from the record tape. Initiation of automatic writing controlled by the eight channel tape passing through the reader means is obtained by closing a start switch 850 to energize a start relay 852 through lines 853, 854, 855, 856 and 857. Energization of the start relay closes contacts 858, 860 to complete a holding circuit for the start relay through lines 861, 862, 863, 864, 856, 857. When the reader is turned on, a code column is already previously located over the photo diodes and is immediately "read." Accordingly, certain of the relay coils 818 are energized to activate the associated contacts in accordance with the code on the tape. Timing mechanism and circuit means are provided to control energization of the various operation controlling devices and comprise a timing gate means in the form of a silicon control rectifier 865 energized through lines 861, 862, 863, 856 and a line 866. The rectifier is triggered during automatic operation through line 867 by the closing of contacts 860 which allows timing gate control means in the form of a capacitaor 868 to energize a line 869 through normally closed contacts 870 and lines 869, 871, 872 through normally open but then closed timing cam operated switch means 839a. The rectifier energizes a line 879 which is connected to a line 880 through normally closed relay contacts 834. The contacts 834 are closed whenever a print operation or functional operation signal is being translated. Whenever a channel eight code signal, which represents a delete or error signal is translated, contacts the 834 are opened and none of the print or function solenoids will be operable. The line 880 is connected either to the functional solenoids or to the print solenoids through the contacts 832. The contacts normally connect line 880 to the functional solenoids 772, 722a, 722b, 793, 794, 796. When a channel seven code signal is received, the contacts are actuated to connect the line 880 to cycle clutch solenoid 622f and certain ones of the print solenoids 622–622e depending on the condition of switches 820, 822, 824, 826, 828, 830. A channel seven code signal is received every time a print operation is being translated. When an operational function is being translated there will be no channel seven code signal.

The print solenoids are connected in parallel in print operation controlling circuit means between lines 881 and 882 by solenoid circuits 884–884f. The functional operation solenoids 772, 722a, 722b, 793, 794, 796 are connected in series by lines 886–886e, between line 880 and a line 888. The functional operation solenoids are connected in functional operation controlling circuit means in series to prevent any possibility of simultaneous functional operation of the writing unit. The coding is designed to provide only one functional operation translation at a time. A stop relay 890 is provided in line 888 and controls normally closed stop contacts 892 between lines 862 and 863. If contacts 834 remain closed and no functional solenoid contacts are operated, the stop relay will be energized to open contacts 892 and deenergize the start relay holding circuit.

When the silicon control rectifier 865 energizes line 879, a reader clutch operation controlling circuit means is also energizable through a line 896, normally open contacts 832b, line 898, reader clutch solenoid 572, normally closed timing contacts 838a, line 900, normally open contacts 832a, a line 902, contacts 904 or contacts 905 and a line 906. The circuit is energized only when contacts 832, 832a, 832b are actuated by print operation signals. The reader clutch solenoid is energized during functional operation input signals by another reader clutch timing gate means comprising a silicon control rectifier 908 through a line 910, contacts 832b, line 898, contacts 838a, line 900, switch 832a, and a line 912. A timing gate control means in the form of a condenser 914 energizes the control rectifier 908 upon actuation of contacts 916 through a line 918, a line 919, and a line 920. A condenser charging circuit is provided by a line 921, the switch 916 and line 918. Assuming that the initial code signal is a print signal, the contacts 832, 832a, 832b are actuated to energize the clutch solenoid 572 and advance the tape to the next code column as the initial print or functional operation is being carried out by the writing unit. Energization of the clutch solenoid causes rotation of the cams 837, 838, 839. Switch 837a is immediately opened to prevent false code signals from reaching the solenoids. When the tape has been advanced one code column, the timing cam 838 opens timing cam operated switch means 838a to deenergize clutch solenoid 572. As soon as the next code column arrives at the read position, beneath the light source and over the photo diode tubes, switch 837a closes and the code signals from the next column will condition the control relay coils through the photo diode circuit 816. The cam 839 closes switch 839a to condition the rectifier 865 for energization immediately after the switch 837a closes and the switch 838a opens. Consequently, the next tape reading step occurs simultaneously with operation of the machine in response to the previously read code signal.

In order to permit the simultaneous operation, a series of interlock switch means 92, 923, 924, 925, 316 and associated interlock circuit means are provided to disassociate the solenoids from the rest of the circuitry while the writing unit is performing its various functional operations in response to the previously fed in code and while the solenoid switches are being conditioned by the next code signals. The switch 922 represents a switch, FIG. 15, mounted on the writing unit frame and actuable by the shift mechanism each time a shift operation takes place. The switch 923 represents a switch mounted on the writing unit, FIG. 8, and operable by the space or backspace mechanism. The switch 924 represents a carrier return switch which is suitably mounted on the writing unit and is actuable by the carrier return mechanism each time the carrier return is operated. The switch 316 represents a character interlock switch which is cam operated by the cam 323, shown in FIG. 13, and mounted on the shaft 128 of the writer unit. The switch 925 is a lever operated switch mounted on the writing unit, as shown in FIG. 8, for actuation by portions of the tabulator linkage. The interlock switches are normally open. Whenever the writing unit begins operation in response to the previous signals, one of the interlock switches closes to energize a gate controlling feed circuit and a gate controlling feed relay 926. The feed circuit comprises line 855, a line 927, a line 928, and a line 929, and is only energized when one of the interlock switches are closed. Assuming that the previous code imparted a print function to the typewriter, the character interlock switch 316 is actuated as soon as or shortly after the time that the print shaft starts to rotae so hat line 855 is conneced to line 927 which actuates feed relay 926 through lines 928, 929. The feed relay controls contacts 870, contacts 904, and contacts 916. When the contacts 870 are actuated, a condenser charging circuit is completed through line 930 and contacts 904 open the anode circuit of the silicon control rectifier 865 to disassociate the control circuitry from the solenoid and switch circuitry.

The reader clutch solenoid 572 is actuated by energization of feed relay 926 by connecting condenser 914 to rectifier 908 through contacts 916, and actuates the reader clutch mechanism to rotate shaft 560 and advance the tape during rotation of shaft 560 when cam follower 580 is actuated by cam 562. The reader cams 837, 838, 839 are rotated with shaft 560 to sequentially actuate the switches 837a, 838a, 839a. Switch 837a is immediately opened to prevent false signals from being generated during tape movement. Switches 838a and 839a are actuated during approximately the first 120° of cam rotation and the last 120° of cam rotation to prevent the code signals from overlapping and limiting the input of signals from one code column to one revolution of the reader clutch and drive shaft 560. When the typewriter operation stops, the interlock switch is opened and the feed circuit is deenergized. When the feed circuit is deenergized, the feed relay 926 is deenergized and contacts 870 returns to their normal position connecting condenser 868 and the line 869 for energization of the silicon control rectifier 865 as soon as the reader cam switch 839a is closed. At that time the silicon control rectifier will permit current to flow through the line 879 to initiate another cycle of operation. It will be understood that the other interlock switches operate in a similar manner.

Because the tab operation of the writer unit is manual, and because the tabulation sequence varies depending on the length of time that the tab selection button is depressed and the length of the tabulation, a special tab interlock circuit means is incorporated in the system and comprises lines 931 and 932 in a tab interlock circuit in which a tab interlock relay device 934 is connected for energization whenever tabulation interlock switch means 925 is actuated. A condenser 935 is provided to limit the time of energization of the relay. Contacts 936 are operated by the relay 934 to connect lines 938 and 940 which will energize the feed relay 926 through line 928 to advance the tape as hereinbefore described. In order to advance the tape, whenever a delete or error signal is generated by a channel eight code signal, an oscillatory type delete circuit interlock means interlock provided by lines 942, 944 and a delete relay 946 are energized by actuation of contacts 834. The delete relay controls contacts 905 and contacts 950 so that the feed relay will be energized and the tape will be fed until a correct code signal is received. The control system will operate automatically and continuously until a stop button 954 in the reader control cluster controlling switch 955 is actuated or until a blank tape is received within the reader. When a blank tape is received in the reader, none of the contacts 832, 834, 820a, 830a will be actuated and, consequently, stop relay 890 will be energized and open stop contacts 892. A start button 956 and an on-off switch 957 are also provided.

Referring now to FIGS. 44 and 45, it may be seen that the electrical components and circuitry of the control system are mounted on a central printed board 960 which is suitably secured to a portion of the reader frame. The central or "mother" board includes a relay circuit portion 962, a photo diode amplification circuit portion 964 and a central component supporting portion 966. Each of the photo diode amplification circuits is mounted on separate printed circuit boards which are slidably receivable in contact supports 970, 972. Each of the self-contained relay units is adapted to be plugged into the associated relay circuits on the portion 962. A diode board 974 may be mounted in a convenient location as shown in FIG. 8. Consequently, the entire reader control system is mounted as a unit adjacent the reader mechanism and is completely housed within the unitary casing of the writing system.

The invention claimed is:

1. In an automatic typewriter system formed by a writing unit, a record forming means for producing a record of writing unit operations, a record reading means for reproducing writing unit operations, a common housing enclosing said system and defining front, rear and side wall portions connected by an upper covering wall, the upper wall of said housing connecting said side wall portions and being divided into front and rear portions, said front wall portion providing an inclined surface extending between said side wall portions and sloping downwardly to said front wall portion, keyboard and control receiving cut-outs formed in said front portion, a raised portion formed centrally of said rear portion and dividing said rear portion into spaced deck portions located at opposite sides of said housing, cut-outs formed in said deck portions, said writing unit being centrally mounted in said housing and having portions received in said raised portion, said record forming means being mounted in one end of said housing adjacent said writing unit and having record receiving portions mounted in the cut-outs in the adjacent deck portion, and said record reading means being mounted in the other end of said housing opposite said one end adjacent said writing unit and having record receiving portions mounted in the other of said cut-outs in the other of the adjacent deck portions.

2. In a writing system having a writing unit automatically operable in response to coded record means, bail means operable to select print characters and cause print operations, reader means to decode said record means and generate electrical signals in response thereto, translation means to translate said electrical signals into mechanical selection and actuation of said bail means and comprising for each of said bail means: a selector interposer, a lug provided on said selector interposer to operably engage said bail means, means pivotally and slidably supporting said selector interposer for movement relative to said bail means between a non-operating position and an operating position, latch means to hold said selector interposer in said non-operating position, latch control means responsive to said electrical signals, shift means to move said selector interposer to said operating position when said latch means is released to condition said bail means for operation by said writing unit, and said translator means further comprising means to actuate said writing unit after said bails have been conditioned by said selector interposers.

3. In a writing unit, a typewriter mechanism including electric motor means for actuation thereof, a coding mechanism for coding a tape in response to actuation of said typewriter mechanism, means mounting said coding mechanism on said typewriter mechanism immediately adjacent one side thereof, a reader mechanism for decoding a tape to cause duplicate actuation of said typewriter mechanism, means mounting said reader mechanism on said typewriter mechanism immediately adjacent another side thereof opposite said coding mechanism, typewriter mechanism operating drive shaft means connected to said electric motor means and extending from side to side, a common drive means for said coding mechanism and said reader mechanism being operably connected to said electric motor means and extending from side to side of said typewriter mechanism between said coding mechanism and said reader mechanism and beyond the sides of the typewriter mechanism, a first coupling means directly connecting said coding mechanism to said common drive means, a second coupling means directly connecting said reader mechanism to said common drive means whereby said coding mechanism and said reader mechanism are adapted to be separately or concurrently operable, and electrical control means for selectively actuating said first and second coupling means to connect one or both of said coding mechanism and said reader mechanism to said common drive means.

4. An electrical typewriter and receiver combination wherein the typewriter is manually operable by key lever selection and automatically operable by receipt of coded input signals representative of typewriter operations through said receiver;

the typewriter having printing mechanism providing for printing operations whereby various selectible type characters may be selectively printed on a sheet of paper or the like;

manually operable key levers 150 arranged on a keyboard for manually selecting typewriter operations;

an electrical motor 90 for operating the tyepwriter;

character selection mechanism 176, 180, 184, 186 controllable by said key levers, including at least one set of coded character selection elements providing a selection code of N bits for the typewriter and operable to select a particular print character and to condition the typewriter for a print operation;

cam shaft means 132 drivably connected to said electric motor and operatively connectable to the character selection mechanism;

N input code selector interposers 634a–e operably connected to said coded character selection mechanism for actuating said coded character selection mechanism in accordance with a coded input signal representative of a preselected type character;

N latch means 648 et seq. operably connected to said input code selector interposer and being selectively operable by coded input signals;

print operation controlling devices 662a–e for each input code selector interposer mounted adjacent each of said latch means and being operably associated with said latch means so as to move said latch means to an unlatched position upon receipt of an input signal;

operating means 666 connected to each of said input code selector interposers to slidably move the input code selector interposers toward an unlatched operative position in driving engagement with said cam shaft means in the unlatched position of said latch means;

said latch means normally restrainingly engaging and maintaining the input code selector interposer in a latched inoperative position out of engagement with said cam shaft means;

one end of each of said input code selector interposers being located in operative engagement with said cam shaft means in the unlatched operative position for causing movement of said input code selector interposers upon actuation of said cam shaft means to an extended position for setting said character selection mechanism;

restoring means 680 drivingly engageable with said input code selector interposers and operably engageable with said cam shaft means to restore said input code selector interposers to the latched inoperative position in latching engagement with said latch means; and the N input code selector interposers acting to set said character selection mechanism during movement of said input code selector interposers to the extended position to cause a preselected type character to be printed by said typewriter in accordance with said input code.

5. The invention as defined in claim 4 and wherein: each of said input code selector interposers being pivotally and slidably mounted for pivotal movement between the latched inoperative position and the unlatched operative position and for sliding movement between the unlatched operative position and the extended position and having: an elongated slot 635, a pivot shaft 162 mounted in said slot and pivotally and slidably supporting the input code selector interposer, and a spring 668 connected to the input code selector interposer and biasing the selector interposer toward the operative position in driving engagement with said cam shaft means.

6. The invention as defined in claim 4 and wherein: said latch means comprising for each input code selector interposer:

a movably mounted latch bar 648, interposer engaging means 650 formed on said latch bar, plate means 654 movably supporting said latch bar, and a latch spring 658 connected to said latch bar and biasing said latch bar to a latching position relative to the input code selector interposer.

7. The invention as defined in claim 4 and having:

an operational cycle shaft 98 selectively drivably connected to said electric motor for rotation thereby and providing a common typewriter operational cycle for each printing operation;

an operational cycle clutch 112 for selectively drivably connecting said operational cycle shaft to said electric motor whenever a character selecting key lever is actuated;

cycle operation mechanism in said typewriter selectively operable whenever a type character is selected by manual actuation of said character selection mechanism;

an additional input code selector interposer 633 operably connected to said cycle operation mechanism;

latch means 648 operably connected to said additional input code selector interposer;

an operational cycle controlling device 662f mounted adjacent to and operably associated with said latch means to move said latch means to an unlatch position upon receipt of an input signal; and means associated with the additional input code selector interposer acting upon movement of said latch means to the unlatched position to move said additional input code selector interposer to an operative position to cause the cycle shift to be operated in said typewriter.

8. An electrical typewriter and receiver combination wherein the typewriter is automatically operable by receipt of coded input signals representative of typewriter operations and having: character selection mechanism including at least one set of coded character selection elements providing a selection code of N bits for the typewriter and being operable to select a particular print character and to condition the typewriter for a print operation; N print operation controlling devices 626a–e operably associated with said character selection elements; N control devices 818a–d for selecting said print operation controlling devices and being selectively operable by coded input signals; cycle operation mechanism in said typewriter selectively operable whenever a type character is selected by said character selection mechanism; an operational cycle controlling device 662f operably associated with said cycle operation mechanism; an additional control device 818e; for selecting said operational cycle controlling device; print operation controlling circuit means associated with said N print operation controlling devices 662a–e and said operational cycle controlling device 662f for selective actuation thereof in accordance with the coded input signals and comprising:

print operation selection means 820, 822, 824, 826, 828, 830 associated with said print operation controlling devices 662a–e and being operable by corresponding ones of said N control devices 818a–d to an actuating position enabling actuation of corresponding ones of said print operation controlling devices, operational cycle selection means 832 associated with said operational cycle controlling device 662f and being operable by the corresponding one of said control devices 818e to a position enabling actuation of said operational cycle controlling device, said operational cycle selection means 832 also being associated with each of said print operation controlling devices 662a–e and preventing actuation thereof unless and until actuation of the operational cycle controlling control device 818e.

9. The invention as defined in claim 8 and having: functional operating mechanism providing for functional operations of the typewriter, functional operation controlling devices 772, 772a, 772b, 793, 794, 796, functional operation controlling circuit means associated with said functional operation controlling devices for selective actuation thereof in accordance with the coded input signals and comprising:

functional operation selection means 820a, 822a, 824a, 826a, 828a, 830a associated with said functional operation controlling devices and being selectively and mutually exclusively operable by corresponding ones of said control devices 818a–d to an enabling position enabling actuation of corresponding ones of said functional operation controlling devices, and said operational cycle selection means 832 also being associated with said functional operation controlling devices and permitting actuation thereof only when there is no coded input signal representative of cycle operation to the exclusion of actuation of any of the print operation controlling devices, and the actuation of said functional operation controlling devices also being mutually exclusive whereby only one of said functional operation controlling devices may be actuated at a time.

10. An electrical typewriter and receiver combination wherein the typewriter is automatically operable by receipt of coded input signals representative of typewriter operations and having:

reader means 74 for providing coded input signals for causing automatic operation of the typewriter from a coded record device having at least N rows of code holes arranged in successive code columns with successive coded input signals being derived from successive code columns;

feed means 560, 562, 580–592, 598 for moving the coded record in step-by-step fashion from code column to code column through said reader means; drive shaft means operable by said typewriter for operating said reader means;

reader clutch means 564 for selectively connecting said drive shaft means to said feed means;

a reader clutch operating means 572 for actuating said clutch means;

N signal generating means 622a–g individually selectively operable by sensing the code holes in the coded record device to provide coded input signals for causing automatic operation of said typewriter;

N control devices 818a–g selectively operable by coded input signals obtained from said signal generating means, there being one control device for each of said signal generating means;

control device actuating circuit means associated with each of said control devices and connecting the associated control device to said source for actuation thereof in response to coded input signals and each circuit means comprising:

record movement correlated means 837a preventing actuation of the associated control device during movement of said record device, and a control means 844 having a conducting state and a non-conducting state preventing actuation of the associated control device until an input signal of a predetermined magnitude is generated by said signal generating means.

11. The invention as defined in claim 10 and having light responsive signal generating means,
an amplification means 842 having a changeable state connected in circuit with said control means and causing said contdol means to be in the conducting state when an input signal of predetermined magnitude is generated by said light responsive signal generating means, the energization of said amplification means also being controlled through said record movement correlated means, and
said signal generating means being connected in circuit with said amplification means to change the state thereof by light passing through a code hole.

12. The invention as defined in claim 10 and having:
tabulation interlock circuit means provided to delay further automatic typewriter operation during a tabulation operation which may exceed the normal length of operation of said typewriter and comprising:
a tabulation interlock device 934 energizable during a tabulation operation of said typewriter,
a tabulation interlock circuit for energizing said tabulation interlock device, and
tabulation interlock switch means 925 controllably associated with said tabulation interlock circuit and being operatble by the tabulation operational mechanism of said typewriter during tabulation operation to cause energization of said tabulation interlock device when tabulation operation begins.

13. The invention as defined in claim 10 and having:
delete interlock circuit means operable in response to a delete code to energize said reader clutch 572 until a non-delete code is received.

14. The invention as defined in claim 10 and having:
timing circuit means associated with print operation controlling circuit means and functional operation controlling circuit means for operating print operation controlling devices 662a–e and functional operation controlling devices 772a–c and said timing circuit means comprising:
timing gates means 839a, 865,
a timing gate control means 839, 868 associated with timing gate means,
said timing gate means comprising a timing cam operated switch means 839a,
said timing gate control means comprising a timing cam 839 associated with the feed means and being operable after completion of advance of the coded record device from code column to code column to actuate said timing gate control means to change the state of said print and functional operation controlling circuit means.

15. The invention as defined in claim 14 and having:
stop circuit means provided to stop further automatic operation of said typewriter whenever there are no controlling input signals received from said reader means and comprising:
a stop device 890 energizable in a no-input signal condition,
a stop circuit for energizing said stop device, and
operational cycle clutch switch means 832 and functional operation switch means 820a, 822a, 824a, 826a, 828a, 830a controllably associated with said stop circuit whereby actuation of any one of them disables said stop circuit preventing energization of said stop device and failure to actuate any one of them enables said timing gate means 865 to energize said stop device.

16. The invention as defined in claim 10 and having:
reader clutch means operation controlling circuit means associated with said reader clutch operating means 572 for selective actuation thereof to actuate the feed means and advance the coded record from code column to code column in the reader means and comprising:
a reader clutch timing gate means 838a, 908 for energizing said reader clutch operating means
a reader clutch timing gate control means 838, 914 associated with said reader clutch timing gate means to energize said reader clutch operating means
said reader clutch timing gate means comprising timing cam operated means 838a in circuit with said reader clutch operating means, and
said reader clutch timing gate control means comprising a timing cam 838 associated with said feed means to actuate said reader clutch timing gate means, said reader clutch means operation controlling circuit means being disabled after advancement of said coded record one code column.

17. The invention as defined in claim 16 and having:
interlock circuit means provided whereby, after operation of said typewriter in response to a prior coded input signal, the next successive coded input signal may be read and the operation selection means set in response thereto without interference with the operation initiated by the prior coded input signal, and comprising:
a plurality of typewriter operated interlock switch means 870, 904, 916, 922, 923, 924, 316 controllably associated with said interlock circuit means and being operable during typewriter operation, and
said interlock switch means being associated with said reader clutch timing gate means and operable to enable and disable said reader clutch means operation controlling circuit means during operation of said typewriter and upon completion of operation of said typewriter.

18. An electrical typewriter and receiver combination wherein the typewriter is manually operable by key lever selection and automatically operable by receipt of coded input signals representative of typewriter operations through said receiver;
the typewriter having printing mechanism providing for printing operations whereby various selectible type characters may be selectively printed on a sheet of paper or the like;
manually operable key levers 150 arranged on a keyboard for manually selecting typewriter opera!ions;
an electrical motor 90 for operating the typewriter;
character selection mechanism 176, 180, 184, 186 controllable by said key levers, including at least one set of coded character selection elements providing a selection code of N bits for the typewriter and operable to select a particular print character and condition the typewriter for a print operation;
N print operation controlling devices 662a–e operably associated with said character selection mechanism so as to select a particular print character and condition the typewriter for a print operation upon receipt of an input signal;
cycle operation mechanism in said typewriter selectively operable whenever a type character is selected by manual actuation of said character selection mechanism;
an operational cycle controlling device 662f operably associated with said cycle operation mechanism to actuate the cycle operation mechanism upon receipt of an input signal;
the typewriter having functional operating mechanism providing for functional operations whereby such functions as spacing, backspacing, carrier return, indexing, and shifting may be obtained;
functional operation selection mechanism controllable by said key levers for selecting the functional operations;
functional operation controlling devices 772a–c operatively associated with said functional operation selection mechanisms to actuate said functional operation selection mechanism upon receipt of an input signal;

print operation controlling circuit means associated with said N print operation controlling devices 662a–e and said additional operational cycle controlling device 662f for selective actuation thereof in accordance with the coded input signals and comprising:

print operation selection means 820, 822, 824, 826, 828, 830 associated with said print operation controlling devices 662a–e and being operable to an actuating position enabling actuation of corresponding ones of said print operation controlling devices, operational cycle selection means 832 associated with said operational cycle controlling device 662f and being operable to a position enabling actuation of said operational cycle controlling device, said operational cycle selection means 832 also being associated with each of said print operation controlling devices 662a–e and preventing actuation thereof unless and until actuation of the operational cycle selection device;

functional operation controlling circuit means associated with said functional operation controlling devices 772, 772a, 772b, 793, 794, 796 for selective actuation thereof in accordance with the coded input signals and comprising:

functional operation selection means 820a, 822a, 824a, 826a, 828a, 830a associated with said functional operation controlling devices and being selectively and mutually exclusively operable to an enabling position enabling actuation of corresponding ones of said functional operation controlling devices, and said cycle operation selection means 832 also being associated with said functional operation controlling devices and permitting actuation thereof only when there is no coded input signal representative of cycle operation to the exclusion of actuation of any of the print operation controlling devices, and the actuation of said functional operation controlling devices also being mutually exclusive whereby only one of said functional operation controlling devices may be actuated at a time.

19. The invention as defined in claim 18 and having:
stop circuit means provided to stop further automatic operation of said typewriter whenever there are no controlling input signals received from said reader means and comprising:

a stop device 890 energizable in a no-input signal condition, a stop circuit for energizing said stop device, and switch means 820a, 822a, 824a, 826a, 828a, 830a, 832 operable in response to receipt of print operation input signals and functional operation input signals and being controllably associated with said stop circuit whereby actuation of any one of them disables said stop circuit preventing energization of said stop device and failure to actuate any one of them enbales said circuit to energize said stop device.

20. The invention as defined in claim 18 and having:
timing circuit means associated with said print operation controlling circuit means and said functional operation controlling circuit means for operating said print operation controlling devices and said functional operation controlling devices and comprising:

timing gate means 839a, 865, timing gate control means 839, 868 associated with said timing gate means, said timing gate means comprising a timing cam operated switch means 839a, said timing gate control means comprising a timing cam 839 operable to actuate said timing gate control means to change the state of said print and functional operation controlling circuit means.

21. The invention as defined in claim 18 and having:
tabulation interlock circuit means provided to delay further automatic typewriter operation during a tabulation operation which may exceed the normal length of operation of said typewriter and comprising:

a tabulation interlock device 934 energizable during a tabulation operation of said typewriter, a tabulation interlock circuit for energizing said tabulation interlock device, and tabulation interlock switch means 925 controllably associated with said tabulation interlock circuit and being operable by the tabulation operational mechanism of said typewriter during tabulation operation to cause energization of said tabulation interlock device when tabulation operation begins.

22. The invention as defined in claim 18 and having:
reader means 74 for providing coded input signals for causing automatic operation of a typewriter from a coded record device having successive code columns;

feed means 560, 562, 580–592, 598 for moving the coded record device in step-by-step fashion from code column to code column through said reader means;

reader clutch means 564 for actuating said feed means;

a reader clutch operation means 572 for selective actuation of said reader clutch means to actuate the record feed means and advance the coded recorded from code column to code column in the reader means;

reader clutch timing means comprising timing cam operated means 838a in circuit with said reader clutch operating means; and reader clutch timing control means comprising timing cam means 838 associated with said feed means to actuate said reader clutch timing means and enable said reader clutch operating means after the coded input signals for each actuation of said typewriter have been derived from each code column and to disable said reader clutch operating means after advancement of said coded record one code column.

23. The invention as defined in claim 22 and having:
interlock circuit means provided whereby, after operation of said typewriter in response to a prior coded input signal, the next successive coded input signal may be read and the operation selection means set in response thereto without interference with the operation initiated by the prior coded input signal, and comprising:

a plurality of typewriter operated interlock switch means 870, 904, 916, 922, 923, 924, 316 controllably associated with said interlock circuit means and being operable during typewriter operation, and said interlock switch means being associated with said reader clutch timing means and operable to enable and disable said reader clutch means operation controlling circuit means during operation of said typewriter and upon completion of operation of said typewriter.

24. The invention as defined in claim 22 and having:
delete interlock circuit means operable in response to a delete code to energize said reader clutch means 572 until a non-delete code is received.

25. An electrical typewriter and receiver combination wherein the typewriter is automatically operable by receipt and translation of coded electrical input signals representative of typewriter operations in said receiver and comprising:
  the typewriter having printing mechanism providing for printing operations whereby various selectable type characters in excess of a number N may be selectively printed on a sheet of paper or the like;
  the typewriter having exteriorly mounted manually operable key lever means for selecting a particular one of said various selectable type characters;
  the typewriter further having interiorly mounted character selection mechanism operable by said manually operable key lever means and including at least one set of coded character selection elements providing a typewriter character selection code of N bits for the typewriter and being movable singularly or in combination to select a particular print character and condition the typewriter for a print operation;
  the typewriter further having operational cycle mechanism selectively operable whenever a type character is selected by said character selection mechanism;
  the receiver having, in addition to the typewriter character selection mechanism and typewriter operational cycle mechanism, a number N of electrical input responsive print operation controlling devices operably associated with said character selection mechanism so as to actuate said character selection mechanism to select a particular print character and condition the typewriter for a print operation upon receipt of an electrical input signal,
  an electrical input responsive operational cycle controlling device operably associated with said operational cycle mechanism to actuate the operational cycle mechanism upon receipt of an electrical input signal,
  print operation controlling electrical circuit means associated with said N electrical input responsive print operation controlling devices and said electrical input responsive operational cycle controlling device for selective actuation of the devices in accordance with the coded electrical input signals and comprising:
  electrical input controlled print operation selection means associated with said electrical input responsive print operation controlling devices and being operable to an actuating position enabling actuation of corresponding ones of said electrical input responsive print operation controlling devices,
  electrical input controlled operational cycle selection means associated with said electrical input responsive operational cycle controlling device and being operable to a position enabling actuation of said electrical input responsive operational cycle controlling device,
  said electrical input controlled operational cycle selection means also being controllably associated with each of said electrical input controlled print operation controlling devices and preventing actuation thereof unless and until actuation of the electrical input controlled operational cycle selection device.

26. The invention as defined in claim 25 and wherein the typewriter further having functional operating mechanism providing for functional operations whereby such functions as spacing, backspacing, carrier return, indexing, and shifting may be performed, the typewriter further having functional operation selection mechanism for selecting the functional operations; and
  the receiver further having electrical input responsive functional operation controlling devices operatively associated with said functional operation selection mechanism to actuate said functional operation selection mechanism upon receipt of an electrical input signal.

27. The invention as defined in claim 26 and the receiver further having:
  functional operation controlling electrical circuit means associated with said electrical input responsive functional operation controlling devices for selective actuation thereof in accordance with the coded electrical input signals and comprising:
  electrical input controlled functional operation selection means associated with said electrical input responsive functional operation controlling devices and being selectively and mutually exclusively operable to an enabling position enabling actuation of corresponding ones of said electrical input responsive functional operation controlling devices, and
  said electrical input controlled operational cycle selection means also being associated with said electrical input responsive functional operation controlling devices and permitting actuation thereof only when there is no coded electrical input signal representative of cycle operation and excluding actuation of any of the electrical input responsive print operation controlling devices,
  and said electrical circuit means being associated with said electrical input responsive functional operation controlling devices in parallel so that the actuation of said electrical input responsive functional operation controlling devices being mutually exclusive whereby only one of said electrical input responsive functional operation controlling devices may be actuated at a time.

28. An electrical typewriter and receiver combination wherein the typewriter is automatically operable by receipt of coded input signals representative of typewriter operations and wherein:
  the typewriter having functional operating mechanism providing for functional operations whereby such functions as spacing, backspacing, carrier return, indexing, and shifting may be obtained;
  functional operation selection mechanism for selecting the functional operations and comprising:
    a series of manually operable functional operation selection interposers 270 slidably mounted in side-by-side parallel relationship,
    interposer actuating means 272 connected to each of said functional operation selection interposers to slidably actuate said selection interposers to an operative position,
    latch means 274 for each of said functional operation selection interposers movable from a latching position holding the functional operation selection interposer in an inoperative position to an unlatched position permitting sliding movement of the selection interposer to the operative position,
    restorer means 736, 787 to return said functional operation selection interposers to the inoperative position with said latch means in said latching position during functional operation by the typewriter;
  input code translating mechanisms for the functional operation selection mechanism of the typewriter;
  each of said input code translation mechanisms comprising:
    release means 744 engageable with said latch means associated with said functional operation selection interposer to move said latch means to the unlatched position,
    latch bar means 752 associated with said release means to hold said release means in a latched inoperative position,
    spring means 758 for moving said release means toward an operative position in releasing engagement with said latch means, spring means 766 for moving said latch bar means toward the latched inoperative position in latching engagement with said release means, functional operation controlling devices 772a–c operatively associated with said latch bar means to actuate said latch bar means and permit movement of the release means into engagement with the latch means 274 to permit the functional operation selection interposer to move to the operative position, and restoring means 776, 784 drivingly connected to said release means for actuation during restoration of the functional operation selection interposer to the inoperative position to return latch bar means 752 to the latching position.

References Cited

UNITED STATES PATENTS

| | | | |
|---|---|---|---|
| 2,346,819 | 4/1944 | Buckley | 197—20 |
| 2,945,576 | 7/1960 | Lapointe et al. | 197—18 X |
| 2,700,446 | 1/1955 | Blodgett | 197—20 |
| 2,879,876 | 3/1959 | Palmer et al. | 177—16 |
| 2,919,002 | 12/1959 | Palmer et al. | 197—16 |
| 3,045,795 | 7/1962 | Morrison et al. | 197—20 |
| 3,197,618 | 7/1965 | Stanley et al. | 197—20 XR |

EDGAR S. BURR, Primary Examiner

U.S. Cl. X.R.

235—61.11; 250—219